United States Patent
Yanagawa et al.

[19]

[11] Patent Number: 6,141,487
[45] Date of Patent: *Oct. 31, 2000

[54] DATA RECORDING/REPRODUCING APPARATUS AND METHOD FOR HIGH SPEED PLAY

[75] Inventors: Yoshifumi Yanagawa, Kyoto; Tadashi Kunihira, Osaka; Makoto Goto, Nishinomiya; Akira Iketani, Higashiosaka; Akihiro Takeuchi, Ikoma; Masazumi Yamada, Moriguchi; Yasuo Hamamoto, Higashiosaka; Chiyoko Matsumi, Suita, all of Japan

[73] Assignee: Matsushita Electric Industrial Co., Ltd., Kadoma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/402,032

[22] Filed: Mar. 10, 1995

[30] Foreign Application Priority Data

Mar. 14, 1994 [JP] Japan .................................. 6-042534
Apr. 5, 1994 [JP] Japan .................................. 6-067116
Oct. 20, 1994 [JP] Japan .................................. 6-254957

[51] Int. Cl.$^7$ ............................................ H04N 5/91
[52] U.S. Cl. ............................................. 386/69; 386/81
[58] Field of Search ................... 386/6, 7, 68, 69, 386/74, 81, 124; 360/8; H04N 5/91

[56] References Cited

U.S. PATENT DOCUMENTS

| | | | |
|---|---|---|---|
| 4,835,628 | 5/1989 | Hinz et al. | 360/48 |
| 4,943,872 | 7/1990 | Yamazaki | 360/8 |
| 5,047,872 | 9/1991 | Heitmann et al. | 360/10.2 |
| 5,051,848 | 9/1991 | Ishii et al. | 360/64 |
| 5,268,802 | 12/1993 | Bar | 360/77.13 |
| 5,282,049 | 1/1994 | Hatakenaka et al. | 358/335 |
| 5,359,428 | 10/1994 | Kubota et al. | 386/33 |
| 5,377,051 | 12/1994 | Lane et al. | 386/81 |
| 5,434,677 | 7/1995 | Oikawa | 386/74 |
| 5,461,486 | 10/1995 | Uchida | 386/81 |
| 5,510,899 | 4/1996 | Kim | 386/69 |

FOREIGN PATENT DOCUMENTS

| | | |
|---|---|---|
| 0469842 | 2/1992 | European Pat. Off. . |
| 0551672 | 7/1993 | European Pat. Off. . |
| 0579156 | 1/1994 | European Pat. Off. . |
| 0606856 | 7/1994 | European Pat. Off. . |
| 0617559 | 9/1994 | European Pat. Off. . |
| 0618567 | 10/1994 | European Pat. Off. . |
| 0650296 | 4/1995 | European Pat. Off. . |
| 258986 | 2/1990 | Japan . |
| 294071 | 4/1990 | Japan . |
| 3288365 | 12/1991 | Japan . |
| 4337568 | 11/1992 | Japan . |
| 4346584 | 12/1992 | Japan . |
| 6131811 | 5/1994 | Japan . |

OTHER PUBLICATIONS

Search Report for European Appl. 95103586.4–, mailed Dec. 9, 1995.

*Primary Examiner*—Young Lee
*Attorney, Agent, or Firm*—Renner, Otto, Boisselle & Sklar LLP

[57] ABSTRACT

A data recording/reproducing apparatus of the invention records data in a plurality of tracks on a tape like recording medium by using a head unit mounted on a rotational cylinder and reproduces recorded data from the tracks, the tracks having at least two azimuth angles different from one another, and the tracks of the different azimuth angles being alternately located on the recording medium, the apparatus including: a formatter for providing, to each of the tracks, a normal data region to be used in normal reproduction and at least one search data region to be used in reproduction at a standard variable reproduction speed; for grouping the plurality of tracks into track sets each having a predetermined number of tracks, each search data region being located in the same position on a corresponding track included in the track set, and for placing identical search data in the search data region of each track included in the track set.

14 Claims, 25 Drawing Sheets

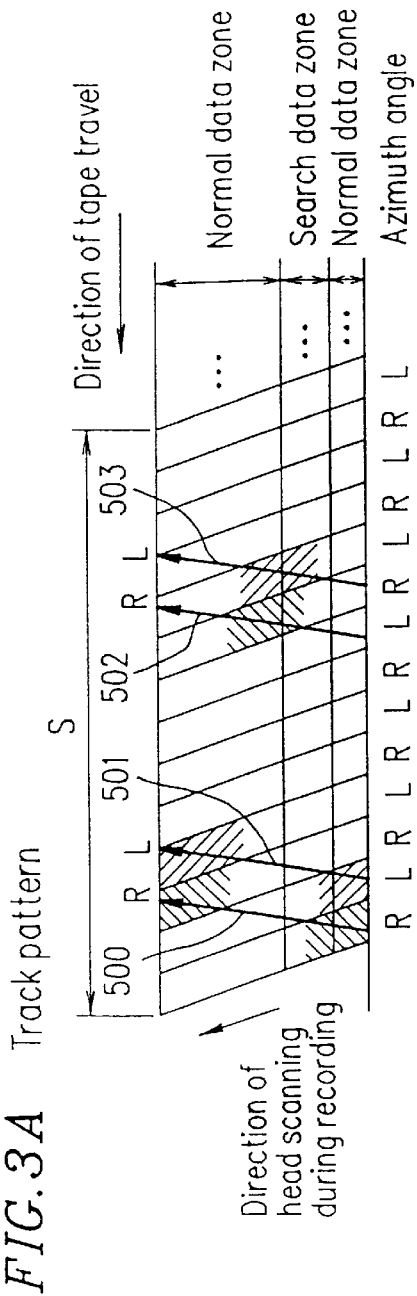
*FIG.3A* Track pattern
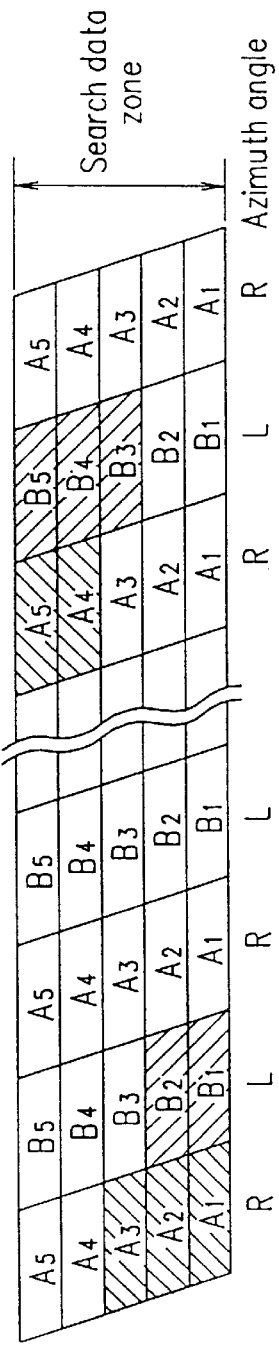
*FIG.3B* Search data regions in an enlarged view
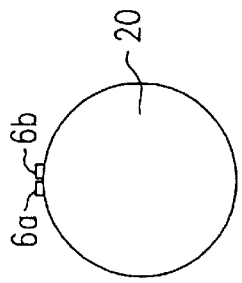
*FIG.3C* Head structure

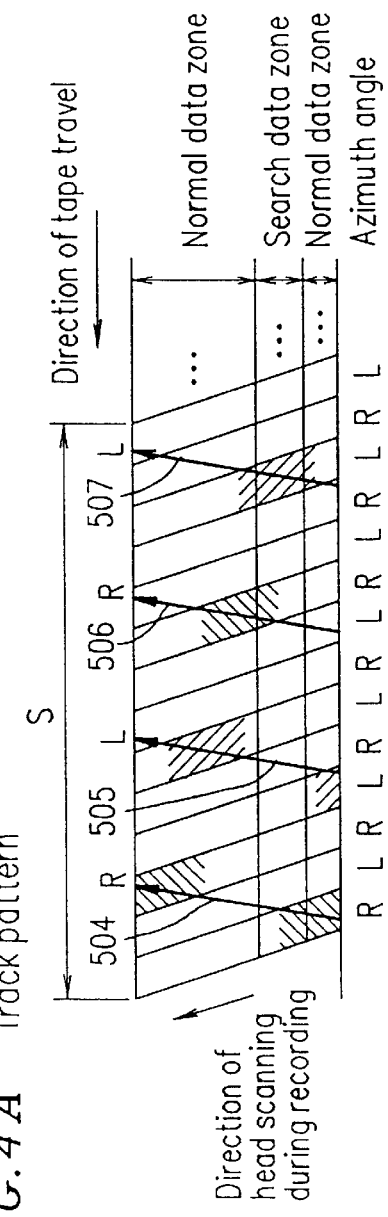
FIG. 4A  Track pattern
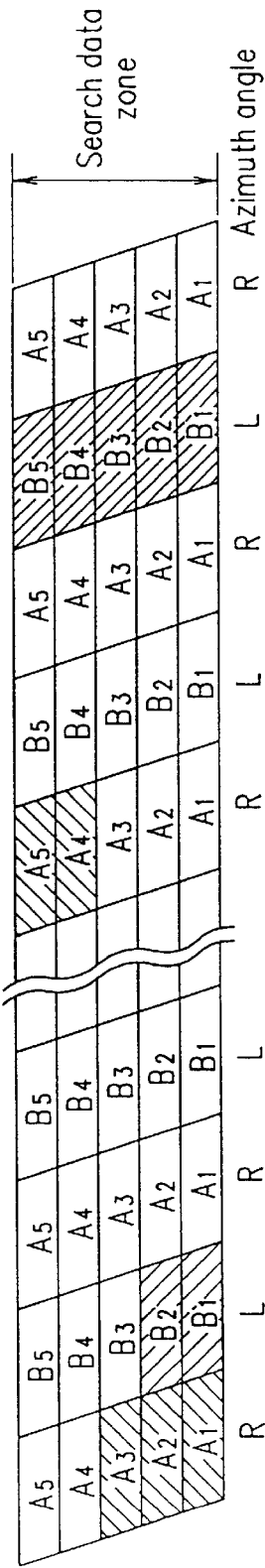
FIG. 4B  Search data regions in an enlarged view
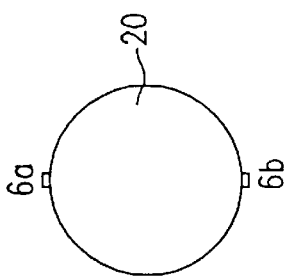
FIG. 4C  Head structure FIG. 5A  Track pattern  (Tw=Tp)
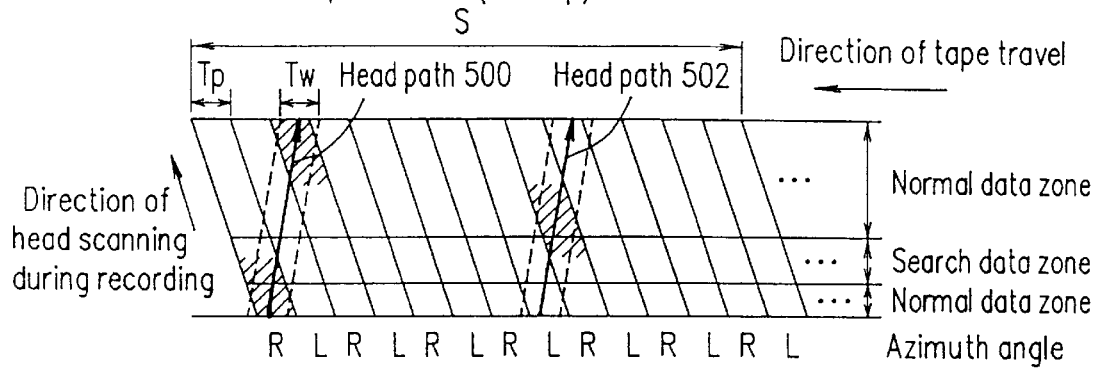
FIG. 5B  Search data regions in an enlarged view  (Tw=Tp)
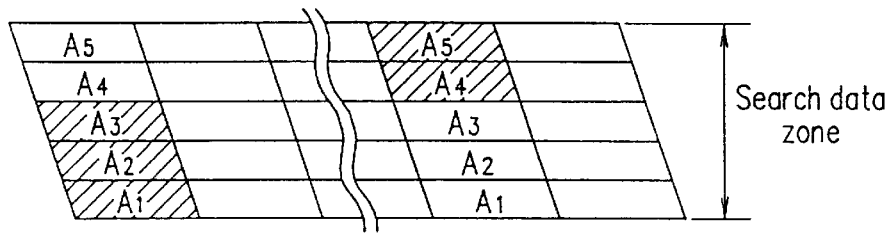
FIG. 5C  Track pattern  (Tw>Tp)
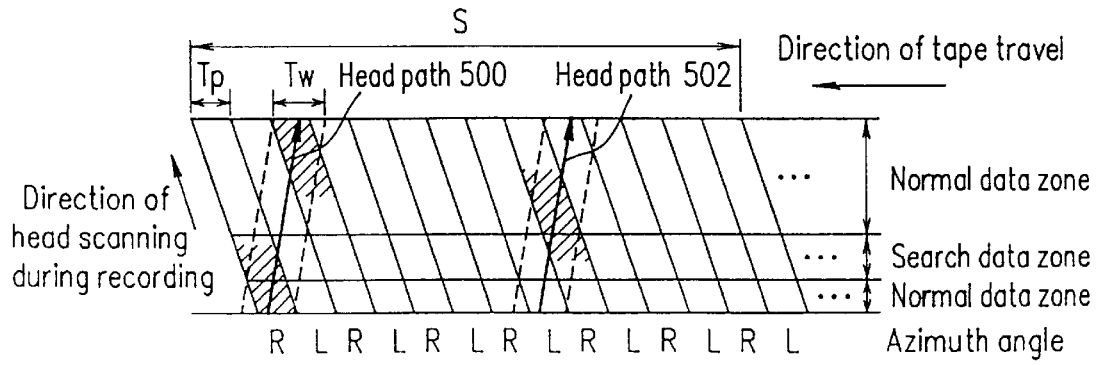
FIG. 5D  Search data regions in an enlarged view  (Tw>Tp)
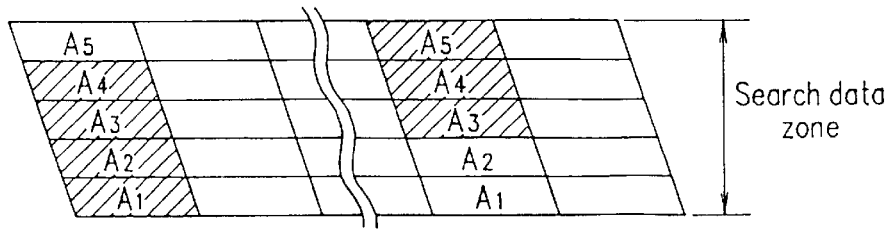

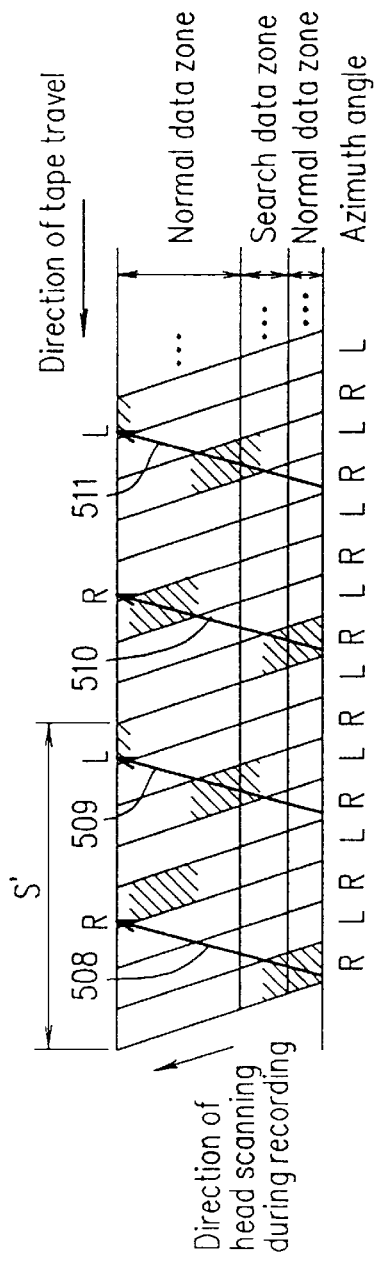
FIG.8A Track pattern
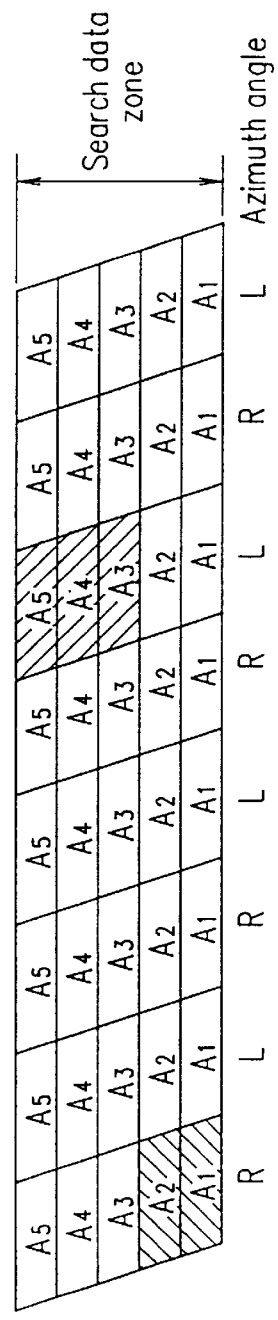
FIG.8B Search data regions in an enlarged view
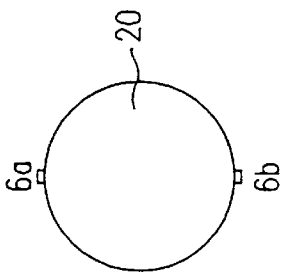
FIG.8C Head structure

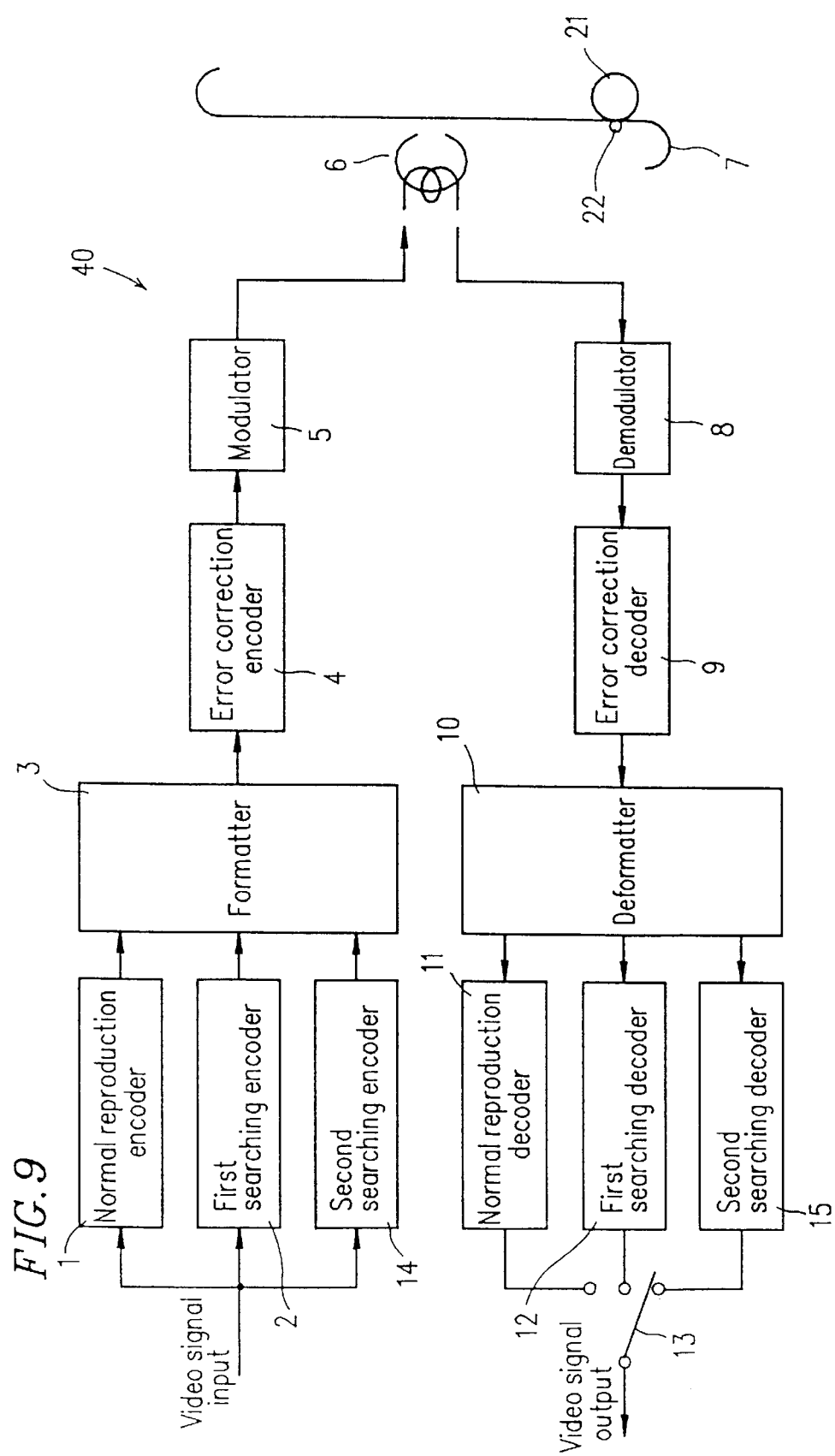

FIG. 11

| | Normal data zone | First search data zone | Second search data zone | First search data zone | Normal data zone |
|---|---|---|---|---|---|
| ⋮ | ⋮ | ⋮ | ⋮ | ⋮ | ⋮ |
| 129 | T+2 | (T+2)b₁ | (T+2)y | (T+2)b₂ | 329 |
| 128 | T+2 | (T+2)a₁ | (T+2)x | (T+2)a₂ | 328 |
| 127 | T+2 | (T+1)b₁ | (T+2)y | (T+1)b₂ | 327 |
| 126 | T+2 | (T+1)a₁ | (T+2)x | (T+1)a₂ | 326 |
| 125 | T+2 | (T+1)b₁ | Ty | (T+1)b₂ | 325 |
| 124 | T+2 | (T+1)a₁ | Tx | (T+1)a₂ | 324 |
| 123 | T+2 | (T+1)b₁ | Ty | (T+1)b₂ | 323 |
| 122 | T+2 | (T+1)a₁ | Tx | (T+1)a₂ | 322 |
| 121 | T+2 | (T+1)b₁ | Ty | (T+1)b₂ | 321 |
| 120 | T+2 | (T+1)a₁ | Tx | (T+1)a₂ | 320 |
| 119 | T+1 | (T+1)b₁ | Ty | (T+1)b₂ | 319 |
| 118 | T+1 | (T+1)a₁ | Tx | (T+1)a₂ | 318 |
| 117 | T+1 | (T+1)b₁ | Ty | (T+1)b₂ | 317 |
| 116 | T+1 | (T+1)a₁ | Tx | (T+1)a₂ | 316 |
| 115 | T+1 | (T+1)b₁ | Ty | (T+1)b₂ | 315 |
| 114 | T+1 | (T+1)a₁ | Tx | (T+1)a₂ | 314 |
| 113 | T+1 | Tb₁ | Ty | Tb₂ | 313 |
| 112 | T+1 | Ta₁ | Tx | Ta₂ | 312 |
| 111 | T+1 | Tb₁ | Ty | Tb₂ | 311 |
| 110 | T+1 | Ta₁ | Tx | Ta₂ | 310 |
| 109 | T | Tb₁ | Ty | Tb₂ | 309 |
| 108 | T | Ta₁ | Tx | Ta₂ | 308 |
| 107 | T | Tb₁ | Ty | Tb₂ | 307 |
| 106 | T | Ta₁ | Tx | Ta₂ | 306 |
| 105 | T | Tb₁ | Ty | Tb₂ | 305 |
| 104 | T | Ta₁ | Tx | Ta₂ | 304 |
| 103 | T | Tb₁ | Ty | Tb₂ | 303 |
| 102 | T | Ta₁ | Tx | Ta₂ | 302 |
| 101 | T | Tb₁ | Ty | Tb₂ | 301 |
| 100 | T | Ta₁ | Tx | Ta₂ | 300 |

Picture

Tape pattern

Update of picture in high speed reproduction

Update of picture in low speed reproduction

Picture

Tape pattern

Update of picture in high speed reproduction

Update of picture in low speed reproduction

DATA RECORDING/REPRODUCING APPARATUS AND METHOD FOR HIGH SPEED PLAY

BACKGROUND OF THE INVENTION

1. Field of the Invention

The present invention relates to an apparatus and a method for recording/reproducing a digital signal such as a digitized video signal, and in particular to a helical scan type digital VCR capable of reproducing recorded data at a reproduction speed different from the normal reproduction speed and a recording/reproducing method using the VCR.

2. Description of the Related Art

A conventional technique for reproducing data at a variable-speed by using a digital VCR is disclosed, for example, in Japanese Laid-Open Patent Publication No. 2-94071.

According to this conventional technique, a video signal is recorded on tracks provided on a magnetic tape by using a magnetic head. The track on the magnetic tape has sub-code areas located along the paths of scanning by the magnetic head during a variable-speed reproduction, and still frame data extracted from the video signal is distributively recorded in the sub-code areas over a plurality of tracks. In variable-speed reproduction, the still frame data is obtained by reproducing the data recorded in the sub-code area, thereby displaying a picture. In order to prevent the magnetic head from scanning off the paths on the distributively located sub-code areas, tracks to be scanned are selected, and the phase of the magnetic tape and the magnetic head is controlled by using a capstan motor.

However, in such a conventional variable-speed reproduction apparatus using sub-code areas, the variable reproduction speed allowing still frame data to be stably obtained is limited to one kind of speed. Recently, limitation to only one kind of variable reproduction speed for VCRs has been inefficient, and the demand for VCRs having a plurality of variable reproduction speeds has been increased. In order to reproduce data at a plurality of variable reproduction speeds by using the conventional technique, it is required to locate the data on each path scanned by the head at different variable reproduction speeds. This makes the data format on the magnetic tape complicated, as well as decreasing the efficiency in using a recording medium because of recording waste data.

Since a picture reproduced at a variable-speed is displayed as a series of intermittent still pictures, in order to update the displayed picture, all the data for one still frame have to be reproduced from a plurality of sub-code areas. Because the sub-code areas being distributively located over a plurality of tracks, when all the data for one still frame have been reproduced from the sub-code area for a variable-speed reproduction, data for normal-speed reproduction corresponding to the still frame data exists at a position far away from the track in which this sub-code area is recorded. Accordingly, there is a problem of an increasing amount of excessive scanning in variable-speed reproduction.

SUMMARY OF THE INVENTION

The data recording/reproducing apparatus of the present invention records data in a plurality of tracks located on a tape like recording medium and reproduces recorded data from the tracks, wherein a standard variable reproduction speed is $(N+0.5)$ times ($N$=an integral number) a normal reproduction speed and identical search data is recorded in predetermined search data regions of at least $(2 \times N+1)$ tracks which are selected from every other track among the plurality of tracks.

According to another aspect of the invention, a data recording/reproducing apparatus records data in a plurality of tracks located on a tape like recording medium and reproduces recorded data from the tracks, wherein a standard variable reproduction speed is $N'$ times ($N'$=an even number) a normal reproduction speed and identical search data is recorded in predetermined search data regions of at least $2N'$ successive tracks of the plurality of tracks.

According to another aspect of the invention, a data recording/reproducing apparatus records data in a plurality of tracks on a tape like recording medium by using a head unit mounted on a rotational cylinder and reproduces recorded data from the tracks, the tracks having at least two azimuth angles different from one another, and the tracks of the different azimuth angles being alternately located on the recording medium, the apparatus including: a formatter for providing, to each of the tracks, a normal data region to be used in normal reproduction and at least one search data region to be used in reproduction at a standard variable reproduction speed; for grouping the plurality of tracks into track sets each having a predetermined number of tracks, each search data region being located in the same position on a corresponding track included in the track set: and for placing identical search data in the search data region of each track included in the track set.

In one embodiment of the invention, the formatter locates search data regions of the tracks included in the track set along a direction of travel of the recording medium, and thereby a search zone for the track set is formed along a direction of travel of the recording medium.

In another embodiment of the invention, the standard variable reproduction speed is $(N+0.5)$ times ($N$=an integral number) a normal reproduction speed, and the formatter groups the plurality of tracks into track sets each having at least $(2 \times N+1)$ tracks selected from every other track among the plurality of tracks.

According to another aspect of the invention, a data reproducing apparatus reproduces data from a tape like recording medium on which a plurality of tracks having at least two azimuth angles different from one another are alternately located, the plurality of tracks being grouped into track sets each formed of more than $(2N+1)$ tracks ($N$=an integral number) selected from every other track among the plurality of tracks, each track having a normal data region and at least one search data region, each search data region included in the track set being located in the same position on a corresponding track, and search data recorded in the search data region of one track being identical with that of another track within the track set, wherein the data reproducing apparatus performs variable-speed reproduction at a standard variable reproduction speed $(N+0.5)$ times a normal reproduction speed.

In another embodiment of the invention, in the recording medium, search data regions included in the track set are located along a direction of travel of the recording medium and thereby a search zone is formed; and a reproduction head unit of the reproducing apparatus reproduces the search data by scanning twice the search zone of each track set in the variable-speed reproduction.

In another embodiment of the invention, the reproduction head unit has two heads each having a different azimuth angle, and reproduces effective search data from each track set by combining data read by one of the two heads in the two scannings of the head unit, or by using data read by one of the two heads in either one of the two scannings of the head unit.

In another embodiment of the invention, a standard variable reproduction speed is N' times (N'=an even number) a normal reproduction speed, and the formatter groups the plurality of tracks into track sets each having at least 2N' successive tracks of the plurality of tracks.

According to another aspect of the invention, a data reproducing apparatus reproduces data from a tape like recording medium on which a plurality of tracks having at least two azimuth angles different from one another are alternately located, the plurality of tracks being grouped into track sets each composed of more than 2N' successive tracks (N'=an even number) of the plurality of tracks, each track having a normal data region and at least one search data region, each search data region included in the track set being located in the same position on a corresponding track, and search data recorded in the search data region of one track being identical with that of another track within the track set, wherein the data reproducing apparatus performs variable-speed reproduction at a standard variable reproduction speed N' times a normal reproduction speed.

In another embodiment of the invention, in the recording medium, search data regions of the tracks included in the track set are located along a direction of travel of the recording medium and thereby a search zone is formed; and a head unit of the reproducing apparatus reproduces the search data by scanning once the search zone of each track set in the variable-speed reproduction.

In another embodiment of the invention, the head unit has two heads each having a different azimuth angle, and reproduces effective search data from each track set by combining data reproduced by the two heads in the one scanning of the head unit, or by using data reproduced by either one of the two heads in the one scanning of the head unit.

According to another aspect of the invention, a data recording/reproducing apparatus records data in a plurality of tracks on a tape like recording medium by using a head unit mounted on a rotational cylinder and reproducing recorded data from the tracks, the tracks having at least two azimuth angles different from one another, and the tracks of the different azimuth angles being alternately located on the recording medium, the apparatus including: a formatter for selecting tracks from the plurality of tracks at predetermined track intervals, and placing very high speed search data to be used in very high speed reproduction in an area of each of the selected tracks with a length equal to or more than a half of a track length.

In another embodiment of the invention, the very high speed search data placed in each of the selected tracks includes repeated data periodically located by a length equal to or less than a maximum value of data length which can be recovered by the head crossing the track in the very high speed reproduction.

In another embodiment of the invention, the formatter selects, for each period of P tracks (P=an integral number), J tracks (J≧4) having the same azimuth angle from the tracks included in each period, and provides identical very high speed search data to the selected J tracks.

In another embodiment of the invention, when a speed of the very high speed reproduction is K (K=a multiple of 4), for the very high reproduction speed K, the formatter locates the J tracks having the very high speed search data regions so that at least three of track intervals Q between the J tracks become Q=K/2.

In another embodiment of the invention, the formatter selects a pair-track, which is a pair of two adjacent tracks each having a different azimuth angle at predetermined track intervals from the plurality of tracks, places the very high speed search data region in the selected pair-track, selects the J' pair-tracks (J'≧2) for each period of P tracks (P=an integral number), and provides identical very high speed search data to the selected J' pair-tracks.

In another embodiment of the invention, when a speed of the very high speed reproduction is K (K=a multiple of 4), for the very high reproduction speed K, the formatter locates the J' pair-tracks having the very high speed search data regions so that at least one of track intervals Q between the J' pair-tracks becomes Q=K/2.

In another embodiment of the invention, the formatter locates the pair-tracks so that the number of the selected pair-tracks which are included within each period of P tracks is J'(J'≧3) and all track intervals between the J' pair-tracks are different from one another.

In another embodiment of the invention, the formatter further includes a unit for selecting tracks at predetermined track intervals from the plurality of tracks and placing very high speed search data to be used in very high speed reproduction in an area of the selected tracks with a length equal to or more than a track length.

In another embodiment of the invention, the formatter further includes a unit for providing an intermittent search data region including a first region commonly scanned in variable-speed reproduction at two or more different variable-speeds and a second region scanned in variable-speed reproduction at one or more variable-speeds to each of predetermined tracks among the plurality of tracks, and placing primary data and secondary data in the first and second regions, respectively.

According to another aspect of the invention, a data recording/reproducing apparatus records data in a plurality of tracks located on a tape like recording medium and reproduces recorded data from the tracks, wherein information to be used in variable-speed reproduction is repeatedly recorded in a predetermined region on the magnetic tape along a direction of travel of the magnetic tape.

In another embodiment of the invention, the predetermined region includes at least one of a video AUX region, a sub-code region, an existing header and a newly produced header.

In another embodiment of the invention, the information to be used in variable-speed reproduction includes data of a standard variable reproduction speed in variable-speed reproduction using a search data region.

In another embodiment of the invention, the information to be used in variable-speed reproduction includes data indicating a location of a search data region to be used in variable-speed reproduction.

According to another aspect of the invention, a data recording/reproducing apparatus records data in a plurality of tracks located on a tape like recording medium and reproduces recorded data from the tracks, wherein the apparatus records data of a picture in normal data regions of a group of tracks and records search data in search data regions included in the group of tracks and tracks located before and after the group of tracks whereby the group of tracks are located at a substantial center of all the tracks having the search data.

In another embodiment of the invention, the formatter places picture data in the normal data regions of a group of tracks and places search data corresponding to the picture data in the search data regions of the track sets including the tracks selected from the group of tracks having the normal data regions and tracks located before and after the group of tracks whereby the group of tracks are located at a substantial center of all the tracks having the search data.

According to another aspect of the invention, a data recording/reproducing apparatus records data in a plurality of tracks located on a tape like recording medium and reproduces recorded data from the tracks, wherein the apparatus generates a plurality of blocks by vertically dividing a picture, generates search data for variable-speed reproduction corresponding to data for each block, and sequentially places the search data in a predetermined region of each track, in the order from a top block of the picture along a direction of tape travel.

According to another aspect of the invention, a data recording/reproducing apparatus records data in a plurality of tracks located on a tape like recording medium and reproduces recorded data from the tracks, wherein the apparatus generates a plurality of blocks by horizontally dividing a picture, generates search data for variable-speed reproduction corresponding to data for each block, and sequentially places the search data in a predetermined region of each track, in the order from the left outermost block of the picture along a direction of tape travel.

According to another aspect of the invention, a data recording/reproducing apparatus records data in a plurality of tracks located on a tape like recording medium and reproduces recorded data from the tracks, the apparatus generating a plurality of blocks by dividing a picture; recording data of each block in a predetermined region for storing data for variable-speed reproduction on the recording medium; and updating a reproduced picture per picture in higher speed reproduction and updating a reproduced picture per block in lower speed reproduction.

In another embodiment of the invention, the picture is vertically divided and data of the blocks is recorded in the region storing the data for variable-speed reproduction along a positive travel direction of the recording medium in the order from a top block of the picture, and a reproduced picture is updated per block in the order from a bottom or a top portion of the picture in the lower speed reproduction.

In another embodiment of the invention, the picture is horizontally divided and data of the blocks is recorded in the region storing data for variable-speed reproduction in the order from the left outermost block of the picture along a positive travel direction of the recording medium, and a reproduced picture is updated per block in the order from the left or the right portion of the picture in the lower speed reproduction.

In another embodiment of the invention, for a plurality of blocks generated by dividing a picture, the formatter sequentially places data for variable-speed reproduction corresponding to data for each block in the search zone.

In another embodiment of the invention, for a plurality of blocks generated by dividing a picture, the formatter sequentially places data of each block in the search zone, updates a reproduced picture per picture in higher speed reproduction and updates a reproduced picture per block in lower speed reproduction.

According to another aspect of the invention, a data recording/reproducing method records data in a plurality of tracks located on a tape like recording medium and reproduces recorded data from the tracks, including the steps of recording identical search data in predetermined search data regions of at least (2×N+1) tracks which are selected from every other track among the plurality of tracks, and reproducing the recorded data at a standard variable reproduction speed of (N+0.5) times (N=an integral number) a normal reproduction speed.

According to another aspect of the invention, a data recording/reproducing method records data in a plurality of tracks located on a tape like recording medium and reproduces recorded data from the tracks, including the steps of recording identical search data in predetermined search data regions of at least 2N' successive (N'=an even number) tracks of the plurality of tracks, and reproducing the recorded data at a standard variable reproduction speed of N' times a normal reproduction speed.

According to another aspect of the invention, a data recording/reproducing method records data in a plurality of tracks on a tape like recording medium by using a head unit mounted on a rotational cylinder and reproducing recorded data from the tracks, the tracks having at least two azimuth angles different from one another, and the tracks of the different azimuth angles being alternately located on the recording medium, the method including the formatting step including the steps of providing, to each of the tracks, a normal data region to be used in normal reproduction and at least one search data region to be used in reproduction at a standard variable reproduction speed, grouping the plurality of tracks into track sets each having a predetermined number of tracks, each search data region being located in the same position on a corresponding track included in the track set, and placing identical search data in the search data region of each track included in the track set.

In another embodiment of the invention, the formatting step includes a step of locating search data regions of the tracks included in the track set along a direction of travel of the recording medium, and thereby forming a search zone for the track set along a direction of travel of the recording medium.

In another embodiment of the invention, the standard variable reproduction speed is (N+0.5) times (N=an integral number) a normal reproduction speed, and in the grouping step, the plurality of tracks are grouped into track sets each having at least (2×N+1) tracks selected from every other track among the plurality of tracks.

According to another aspect of the invention, a data reproducing method reproduces data from a tape like recording medium on which a plurality of tracks having at least two azimuth angles different from one another are alternately located, the plurality of tracks being grouped into track sets each formed of more than (2N+1) tracks (N=an integral number) selected from every other track among the plurality of tracks, each track having a normal data region and at least one search data region, each search data region included in the track set being located in the same position on a corresponding track, and search data recorded in the search data region of one track being identical with that of another track within the track set, wherein the reproducing method includes a step of performing variable-speed reproduction at a standard variable reproduction speed (N+0.5) times a normal reproduction speed.

In another embodiment of the invention, in the recording medium, search data regions included in the track set are located along a direction of travel of the recording medium and thereby a search zone is formed; and the method includes a step of reproducing the search data by scanning twice the search zone of each track set in the variable-speed reproduction.

In another embodiment of the invention, the variable-speed reproduction is performed by using a head unit having two heads each having a different azimuth angle, and the reproducing step includes reproducing effective search data from each track set by combining data read by one of the two heads in two scannings of the head unit, or by using data read by one of the two heads in either one of the two scannings of the head unit.

In another embodiment of the invention, a standard variable reproduction speed is N' times (N'=an even number) a normal reproduction speed, and in the grouping step, the plurality of tracks are grouped into track sets each having at least 2N' successive tracks of the plurality of tracks.

According to another aspect of the invention, a data reproducing method reproduces data from a tape like recording medium on which a plurality of tracks having at least two azimuth angles different from one another are alternately located, the plurality of tracks being grouped into track sets each composed of more than 2N' successive tracks (N'=an even number) of the plurality of tracks, each track having a normal data region and at least one search data region, each search data region included in the track set being located in the same position on a corresponding track, and search data recorded in the search data region of one track being identical with that of another track within the track set, the data reproducing method including a step of performing variable-speed reproduction at a standard variable reproduction speed N' times a normal reproduction speed.

In another embodiment of the invention, in the recording medium, search data regions of the tracks included in the track set are located along a direction of travel of the recording medium and thereby a search zone is formed; and wherein the method includes a step of reproducing the search data by scanning once the search zone of each track set in the variable-speed reproduction.

In another embodiment of the invention, the variable-speed reproduction is performed by using a head unit having two heads each having a different azimuth angle, and wherein the reproducing step includes reproducing effective search data from each track set by combining data reproduced by the two heads in one scanning of the head unit, or by using data reproduced by either one of the two heads in the one scanning of the head unit.

According to another aspect of the invention, a data recording/reproducing method records data in a plurality of tracks on a tape like recording medium by using a head unit mounted on a rotational cylinder and reproducing recorded data from the tracks, the tracks having at least two azimuth angles different from one another, and the tracks of the different azimuth angles being alternately located on the recording medium, the method including the formatting step including the steps of selecting tracks from the plurality of tracks at predetermined track intervals, and placing very high speed search data to be used in very high speed reproduction in an area of each of the selected tracks with a length equal to or more than a half of a track length.

In another embodiment of the invention, the formatting step includes placing the very high speed search data in each of the selected tracks by periodically locating data having a length equal to or less than a maximum value of data length which can be recovered by the head crossing the track in the very high speed reproduction.

In another embodiment of the invention, the formatting step further includes the steps of selecting, for each period of P tracks (P=an integral number), J tracks (J>4) having the same azimuth angle from the tracks included in each period, and providing identical very high speed search data to the selected J tracks.

In another embodiment of the invention, when a speed of the very high speed reproduction is K (K=a multiple of 4), the formatting step includes a step of locating the J tracks having the very high speed search data regions so that at least three of track intervals Q between the J tracks become Q=K/2, for the very high reproduction speed K.

In another embodiment of the invention, the formatting step further includes the steps of selecting a pair-track, which is a pair of two adjacent tracks each having a different azimuth angle, at predetermined track intervals from the plurality of tracks, placing the very high speed search data region in the selected pair-track, selecting the J' pair-tracks (J'>2) for each period of P tracks (P=an integral number), and providing identical very high speed search data to the selected J' pair-tracks.

In another embodiment of the invention, when a speed of the very high speed reproduction is K (K=a multiple of 4), the formatting step includes a step of locating the J' pair-tracks having the very high speed search data regions so that at least one of track intervals Q between the J' pair-tracks becomes Q=K/2, for the very high reproduction speed K.

In another embodiment of the invention, the formatting step includes locating the pair-tracks so that the number of the selected pair-tracks which are included within each period of P tracks is J'(J'≧3) and all track intervals between the J' pair-tracks are different from one another.

In another embodiment of the invention, the formatting step further includes the steps of selecting tracks at predetermined track intervals from the plurality of tracks, and placing very high speed search data to be used in very high speed reproduction in an area of the selected tracks with a length equal to or more than a track length.

In another embodiment of the invention, the formatting step further includes the steps of providing an intermittent search data region including a first region commonly scanned in variable-speed reproduction at two or more different variable-speeds and a second region scanned in variable-speed reproduction at one or more variable-speeds to each of predetermined tracks among the plurality of tracks, and placing primary data and secondary data in the first and second regions, respectively.

According to another aspect of the invention, a data recording/reproducing method records data in a plurality of tracks located on a tape like recording medium and reproduces recorded data from the tracks, the method including a step of repeatedly recording information to be used in variable-speed reproduction in a predetermined region on the magnetic tape along a direction of travel of the magnetic tape.

According to another aspect of the invention, a data recording/reproducing method records data in a plurality of tracks located on a tape like recording medium and reproduces recorded data from the tracks, wherein the method includes the steps of recording data of a picture in normal data regions of a group of tracks, and recording search data in search data regions included in the group of tracks and tracks located before and after the group of tracks whereby the group of tracks are located at a substantial center of all the tracks having the search data.

In another embodiment of the invention, the formatting step includes the steps of placing picture data in the normal data regions of a group of tracks, and placing search data corresponding to the picture data in the search data regions of the track sets including the tracks selected from the group of tracks having the normal data regions and tracks located before and after the group of tracks whereby the group of tracks are located at a substantial center of all the tracks having the search data.

According to another aspect of the invention, a data recording/reproducing method records data in a plurality of tracks located on a tape like recording medium and reproduces recorded data from the tracks, the method including the steps of generating a plurality of blocks by vertically dividing a picture, generating search data for variable-speed reproduction corresponding to data for each block, and sequentially placing the search data in a predetermined region of each track, in the order from a top block of the picture along a direction of tape travel.

According to another aspect of the invention, a data recording/reproducing method records data in a plurality of tracks located on a tape like recording medium and reproduces recorded data from the tracks, the method including the steps of generating a plurality of blocks by horizontally dividing a picture, generating search data for variable-speed reproduction corresponding to data for each block, and sequentially placing the search data in a predetermined region of each track, in the order from the left outermost block of the picture along a direction of tape travel.

According to another aspect of the invention, a data recording/reproducing method records data in a plurality of tracks located on a tape like recording medium and reproduces recorded data from the tracks, the method including the steps of generating a plurality of blocks by dividing a picture, recording data of each block in a predetermined region for storing data for variable-speed reproduction on the recording medium, updating a reproduced picture per picture in higher speed reproduction, and updating a reproduced picture per block in lower speed reproduction.

In another embodiment of the invention, the formatting step includes the steps of generating a plurality of blocks by dividing a picture, and sequentially placing data for variable-speed reproduction corresponding to data for each block in the search zone.

In another embodiment of the invention, the formatting step includes the steps of generating a plurality of blocks by dividing a picture, sequentially placing data of each block in the search zone, and updating a reproduced picture per picture in higher speed reproduction and per block in lower speed reproduction.

Thus, the invention described herein makes possible the advantages of providing data reproducing method and apparatus capable of: (1) displaying a reproduced picture of high quality in variable-speed reproduction without phase-control by a capstan motor, by reproducing data recorded in a search data region; (2) displaying a reproduced picture of high quality at a plurality of variable reproduction speeds in a wide range, by using a different cycle of update of the picture in accordance with each variable reproduction speed; and (3) smoothly shifting between normal-speed reproduction and the variable-speed reproduction in an arbitrary position of a recording medium, decreasing the amount of excessive scanning during the search in the variable-speed reproduction.

These and other advantages of the present invention will become apparent to those skilled in the art upon reading and understanding the following detailed description with reference to the accompanying drawings.

BRIEF DESCRIPTION OF THE DRAWINGS

FIG. 3A is a schematic diagram showing the track pattern when using a combination head of the present invention in Example 1.

FIG. 3B is an enlarged view showing the search data regions when using a combination head in Example 1.

FIG. 3C is a diagram showing the arrangement of the heads in the combination head.

FIG. 4A is a schematic diagram showing the track pattern of the present invention when using a head having two heads set apart from each other by an angular distance of 180° in Example 1.

FIG. 4B is an enlarged view showing the search data regions when using a head having two heads set apart from each other by an angular distance of 180° in Example 1.

FIG. 4C is a diagram showing the arrangement of heads set apart from each other by an angular distance of 180°.

FIG. 5A is a schematic diagram showing the track pattern in the case where the head width is equal to the track pitch.

FIG. 5B is an enlarged view showing the search data regions in the case where the head width is equal to the track pitch.

FIG. 5C is a schematic diagram showing the track pattern in the case where the head width is larger than the track pitch.

FIG. 5D is an enlarged view showing the search data regions in the case where the head width is larger than the track pitch.

FIG. 8A is a schematic diagram showing the track pattern in Example 3 of the present invention.

FIG. 8B is an enlarged view showing the search data regions in Example 3 of the present invention.

FIG. 8C is a diagram showing the arrangement of heads in Example 3.

FIG. 9 is a block diagram showing a data recording/reproducing apparatus in Example 4 of the present invention.

FIG. 11 is a diagram showing the track pattern in a case where a search data region is divided into a plurality of parts.

DESCRIPTION OF THE PREFERRED EMBODIMENTS

A data reproducing apparatus 30 of Example 1 of the present invention will be described with reference to the accompanying drawings.

EXAMPLE 1

Figure 1:
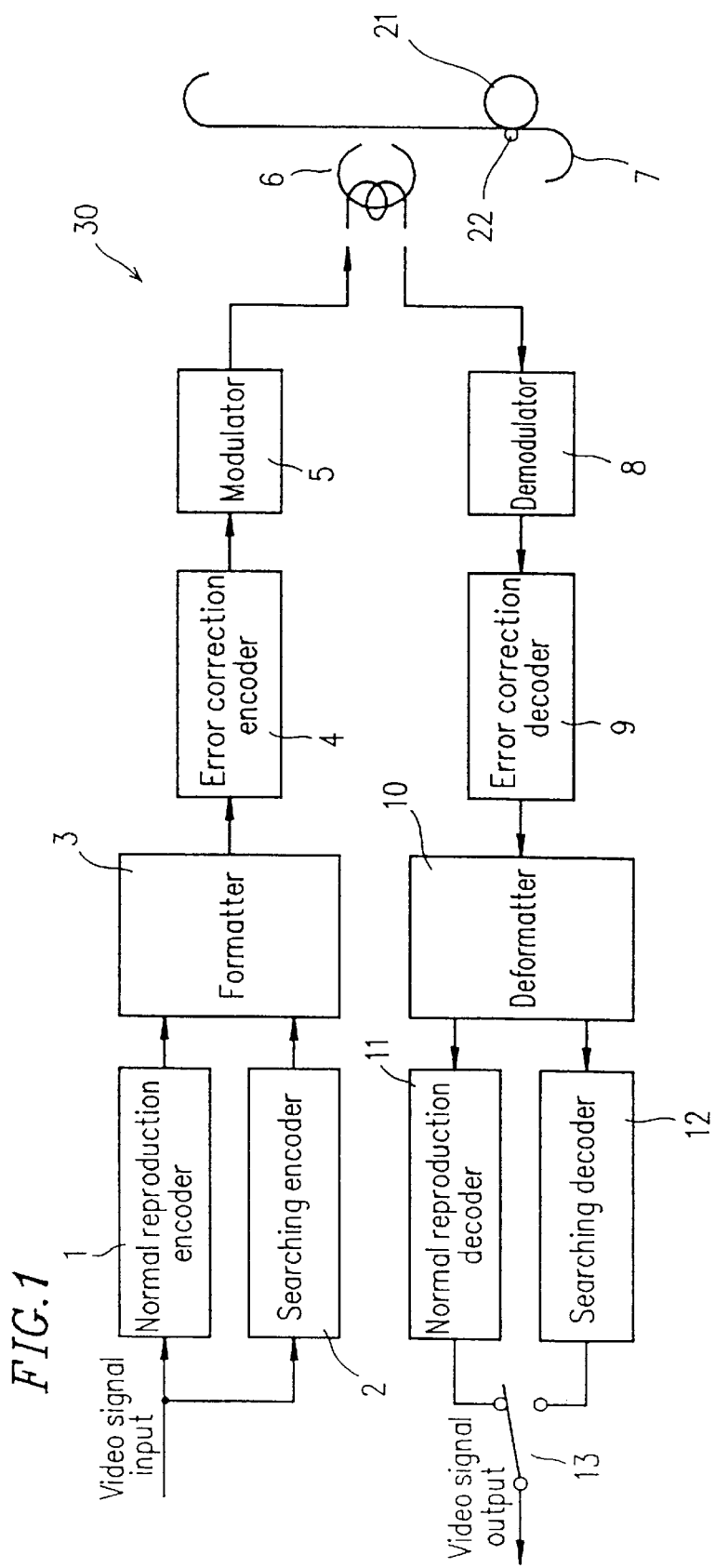
FIG. 1 is a block diagram showing a data recording/reproducing apparatus of the present invention in Example 1.

FIG. 1 shows a block diagram for a data recording/reproducing apparatus 30. As shown in FIG. 1, the data recording/reproducing apparatus 30 includes a normal reproduction encoder 1, a searching encoder 2, a formatter 3, an error correction encoder 4, a modulator 5, a magnetic head 6, a demodulator 8, an error correction demodulator 9, a deformatter 10, a normal reproduction decoder 11, a searching decoder 12, a switch 13, a pinch roller 21 and a capstan motor 22. A video signal input to the data recording/reproducing apparatus 30 is recorded onto a magnetic tape 7 via the magnetic head 6. The data recorded on the magnetic tape 7 is reproduced via the magnetic head 6.

As shown in FIGS. 3C or 4C, the magnetic head 6 includes, for example, two heads 6a and 6b provided on a cylinder 20. The heads 6a and 6b have azimuth angles R and L, respectively, which are different from each other. Though the magnetic head 6 of Example 1 is composed of two heads, an additional head may be further provided on the magnetic head 6. In the case of performing a recording operation, a combination head (see FIG. 3C) composed of two closely spaced heads is preferably used.

The data recording/reproducing apparatus 30 has a normal reproduction mode for reproducing data at a normal speed and a search mode for reproducing data at one or more variable (high) reproduction speeds. Hereinafter, operations of the data recording/reproducing apparatus 30 will be described with respect to the case where a standard variable reproduction speed $v_1 = N + 0.5$. For simplicity of the description, the case where N=3, v=3.5 (times a normal reproduction speed) will be explained as an example.

When the input signal is recorded, the magnetic tape 7 is driven by the capstan motor 22 and the pinch roller 21, so that it travels at a normal play speed. The input signal may include a video signal, a speech signal and the like. In a case where the input signal is an analog signal, it is A/D converted into a digital signal. Hereinafter, it is assumed that the input signal is a digital video signal, and that image data is recorded onto the magnetic tape 7. However, the data to be recorded onto the magnetic tape is not limited to image data.

An input digital video signal is fed to the normal reproduction encoder 1 and the searching encoder 2. The normal reproduction encoder 1 compresses the image data if necessary, and outputs the data to the formatter 3 as normal reproduction data. The searching encoder 2 generates search data from the received digital video signal, and outputs it to the formatter 3. The search data is, for example, data generated by more highly compressing the image data than the normal reproduction encoder 1 which allows it to reproduce a picture from a smaller amount of data. Alternatively, the searching encoder 2 may output the input digital video signal to serve as search data according to the format. For example, the normal reproduction encoder 1 may generate encoded data by using intra-frame and inter-frame compressing of the image data, and the searching encoder 2 may generate encoded data only by using intra-frame compressing of the image data.

With respect to the standard variable reproduction speed of v=3.5 (times the normal reproduction speed) (N=3), while each of the heads 6a and 6b records (2N+1)=7 tracks, the searching encoder 2 outputs identical data for two heads, respectively. These (2N+1) tracks form one set of tracks. The formatter 3 provides, for each track, a normal data region to be used for a normal-speed reproduction and a search data region to be used for variable-speed reproduction. Normal reproduction data fed from the normal reproduction encoder 1 is allocated to the normal data region. Search data fed from the searching encoder 2 is allocated to the search data region. In this way, a track set composed of (2N+1) tracks having one identical search data recorded by the head 6a and a track set composed of (2N+1) tracks having another identical search data recorded by the head 6b are formed.

Herein, in order to reduce the number of search data regions, image data of one frame may be recorded after being divided into M portions. In Example 1, a case where the dividing number M is two, and one frame is divided into upper and lower halves will be described.

The searching encoder 2 extracts image data T representing image of one frame at a time t and splits it into upper and lower halves. Then, the upper half of the image data T is compressed and encoded to generate data Ta, which is output for the track recorded by the head 6a. Likewise, the searching encoder 2 compresses and encodes the lower half of the image data T to generate data Tb, which is output for the track recorded by the head 6b. The searching encoder 2 outputs the data Ta to the head 6a while the head 6a is recording a track set (i.e., (2N+1) tracks). The searching encoder 2 outputs the data Tb to the head 6b while the head 6b is recording the corresponding track set (i.e., (2N+1) tracks).

After the magnetic heads 6a and 6b each records one track set, the searching encoder 2 extracts image data (T+1) of the following one frame at a time t from the input video signal. In a manner similar to the above-mentioned one, the upper half of the image data (T+1) is compressed and encoded to generate data (T+1)a, which is output for the track recorded by the head 6a. Likewise, the searching encoder 2 compresses and encodes a lower half of the image data (T+1) to generate data (T+1)b, which is output for the track recorded by the head 6b. The searching encoder 2 outputs the data (T+1)a to the head 6a while the head 6a is recording the following track set. The searching encoder 2 outputs the data (T+1)b to the head 6b while the head 6b records the following track set.

Herein, the amount of data included in the upper half of the picture is not required to be the same as that of the lower half. Moreover, the amount of data included in the upper (lower) half of one picture is not required to be the same as that of another picture. Namely, the length of a search data region along the track can be arbitrarily selected in accordance with the amount of data, for each track set.

The formatter 3 has a memory capable of storing image data for at least one track and arranges the normal reproduction data and the search data by the sync block composed of a plurality of data so that the normal reproduction data and the search data are recorded at predetermined positions within the track, respectively. Moreover, the formatter 3 adds an identification flag indicating whether it is the normal reproduction data or the search data to the arranged data on the track in memory. Then, starting from the leading edge of the tracks, the resultant data is sequentially output to the error correction encoder 4. The length of the sync block for storing the search data is not necessarily equal to that for storing the normal reproduction data.

The error correction encoder 4 receives data output from the formatter 3 and adds an error correction code for each sync block as one unit and another error correction code for a plurality of sync blocks as one unit. The modulator 5 receives an output from the error correction encoder 4, adds synchronization information and ID information thereto, modulates and outputs it to the magnetic head 6. The modulated signal is recorded on the magnetic tape 7 by the magnetic head 6.

Herein, (2N+1)=7 tracks having the same azimuth angle and recorded by one of the heads 6a and 6b form one track set. In each track set, each of search data regions recording identical search data is located by the formatter 3 at the same position in each track, and is recorded at the same position in the corresponding track on the magnetic tape 7. Hence, the search data regions of the tracks included in one track set are located parallel to the direction of tape travel, thereby forming one search data zone. This search data zone can be located at an arbitrarily position, in units of track sets each composed of (2N+1)=7 tracks. For example, in a case where an audio signal region is previously reserved on the track, the search data zone can be located so as not overlap with the audio signal region.

Figure 2:
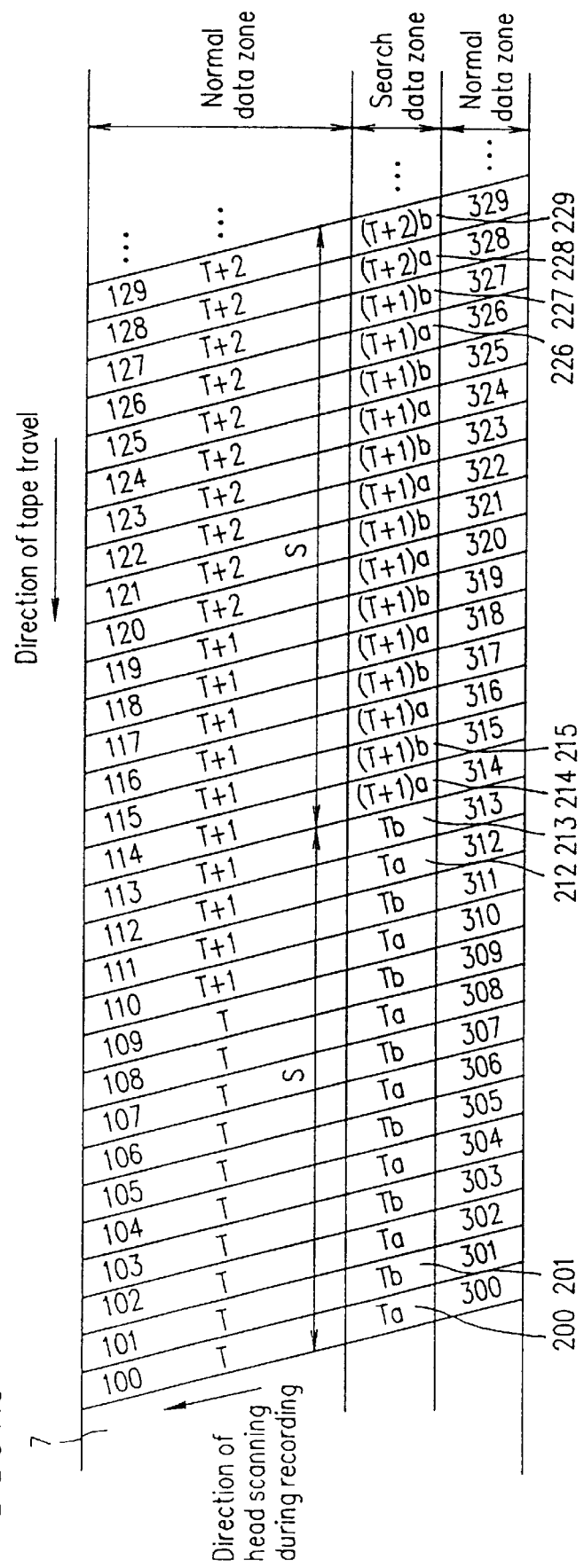
FIG. 2 is a diagram showing the track pattern of the present invention in Example 1.

FIG. 2 shows a pattern of tracks recorded on the magnetic tape 7 in accordance with a format arranged by the formatter 3. In Example 1, the formatter 3 provides one search data region for each track. For example, the left outermost track shown in FIG. 2 has a search data region 200 located between normal data regions 100 and 300. Normal data regions 100 through 129 and 300 through 329 of successively located tracks form a normal data zone along the direction of tape travel. Likewise, search data regions 200 through 229 form a search data zone along the direction of tape travel. By using the formatter 3, normal reproduction data into the normal data regions 100 through 129 and 300 through 329, and search data are recorded into the search data regions 200 through 229.

In the normal data zone, image data of one frame is recorded by using ten tracks. That is, image data T of one frame at a time t is recorded on normal data regions 100 through 109 and 300 through 309. Next, image data (T+1) of one frame at a time (t+1) is recorded on normal data regions 110 through 119 and 310 through 319.

On the other hand, in the search data zone, search data obtained by highly compressing the image data of one frame is recorded by using M×(2N+1)=2×7=14 tracks. In the search data zone, data Ta obtained by highly compressing the upper half of the image data T of one frame at a time t is recorded in a search data region 200. Next, data Tb obtained by highly compressing the lower half of the image data T of one frame at a time t is recorded in a search data region 201. The data Ta is placed on every other track to be recorded in search data regions 200, 202 . . . 212. Likewise, the data Tb is placed on every other track to be recorded in search data regions 201, 203 . . . 213. Thus, each of the data Ta and Tb is recorded on (2N+1)=7 tracks. Next, data (T+1)a obtained by highly compressing the upper half of the image data (T+1) of one frame at a time (t+1) is recorded in a search data region 214, while data (T+1)b obtained by highly compressing the lower half of the image data (T+1) of one frame at a time (t+1) is recorded in a search data region 215. In this way, the data (T+1)a is placed on every other track to be recorded in search data regions 214, 216 . . . 228, while the data (T+1)b is placed on every other track to be recorded in search data regions 215, 217 . . . 229. Thus, each of the data (T+1)a and (T+1)b is recorded on (2N+1)=7 tracks. The foregoing operation is sequentially repeated.

As described hereinbefore, where M=2 (M=the dividing number by which one picture is divided), in the search data region, data corresponding to a picture of one frame is recorded by using M×(2N+1)=14 tracks. An update cycle S (i.e., a period required for obtaining image data adequate to reproduce a picture of one frame) is represented by the number of tracks recorded on the magnetic tape as S=M×(2N+1)=14 tracks.

Next, with reference to FIG. 1 again, the operation of the data recording/reproducing apparatus 30 in reproducing data will be described. The magnetic tape 7 is driven at a predetermined speed by the capstan motor 22 and the pinch roller 21. In the variable-speed reproduction, the magnetic tape 7 travels at a speed (N+0.5) times the normal speed. The data recorded on the magnetic tape 7 is reproduced by the magnetic head 6. The demodulator 8 demodulates reproduced data, removes synchronization information and decodes ID information. The resultant data is output to the error correction decoder 9, which performs error correction for the received data in units of one sync block and in units of a plurality of sync blocks. The resultant data is output to the deformatter 10. Based on the identification flag, the deformatter 10 divides the data into normal reproduction data and search data. A part of the ID information of the sync block may be used in the error correction decoder 9. The normal reproduction data is decoded by the normal reproduction decoder 11, while the search data is decoded by the searching decoder 12. The switch 13 selects an output from the normal reproduction decoder 11 in the normal reproduction and an output from the searching decoder 12 in the variable-speed reproduction and outputs this as a video signal.

With reference to FIGS. 3A through 3C, a method for reproducing image data from the search data region will be described.

First, the case where the magnetic head 6 is a combination head as shown in FIG. 3C composed of two heads 6a (azimuth angle R) and 6b (azimuth angle L) mounted on the cylinder 20 which are closely spaced to each other will be described. In the following description, a distance (stagger) between the heads 6a and 6b is taken into consideration. Furthermore, it is assumed that a gap length (head width Tw) of the magnetic head 6 is equal to a track pitch Tp. FIG. 3A is a schematic view showing the pattern of tracks formed by the combination head. FIG. 3B is an enlarged view showing the search data region shown in FIG. 3A.

In FIG. 3A, paths 500 and 502 show the scanning of the head 6a in the reproduction at a speed 3.5 times the normal play speed, while paths 501 and 503 show the scanning of the head 6b in the reproduction at a speed 3.5 times the normal play speed. Herein, it is assumed that the data recorded on a target track can be effectively reproduced if each of the heads recovers the track with the width of more than a half of the track width (track pitch). In this case, the data recorded in shadowed portions of the tracks shown in FIGS. 3A and 3B is effectively reproduced by the scanning performed by each head.

As can be seen from FIG. 3A, in the reproduction at a speed 3.5 times the normal speed, each of the heads 6a (azimuth angle R) and 6b (azimuth angle L) certainly scans twice the search data zone within an update cycle S=2×(2N+1)=14 tracks. In the search data zone with the cycle S, all the tracks of an R azimuth angle (hereinafter, referred to as "R-tracks") have identical search data. Hence, without phase control of the capstan motor 22, the head 6a can reproduce necessary data from the search data regions of any two R-tracks on which the head 6a has scanned. Likewise, since all the tracks of an L azimuth angle (hereinafter, referred to as "L-tracks") have identical search data, without phase control of the capstan motor 22, the head 6b can reproduce necessary data from the search data regions of any two L-tracks on which the head 6b has scanned. Hereinafter, with reference to FIG. 3B, the operation of data reproduction from the search data region will be described in more detail.

In the search data region, the data Ta obtained by compressing the upper half of the image data T at a time t is recorded on each R-track, being divided into a plurality of data groups. In Example 1, the data Ta is divided into, for example, five data groups (A1, A2, A3, A4 and A5) so that each data group is recorded onto a sync block as search data. Likewise, the data Tb obtained by compressing the lower half of the image data T at a time t is divided, into five data groups (B1, B2, B3, B4 and B5) so as to be recorded on the search data region of the L-track.

Herein, in a case where the head 6a scans along a path 500, data groups A1, A2 and A3 are reproduced from one R-track. Then, by the next scanning (a path 502) performed by the head 6a, data groups A4 and A5 are reproduced from another R-track. Accordingly, by complementarily performing two scannings, the head 6a can effectively reproduce all the data recorded in the search data region having the same azimuth angle as that of the head 6a. On the other hand, the head 6b (azimuth angle L) scans along a path 501 owing to a stagger. The head 6b reproduces data groups B1 and B2 from one L-track by the scanning of the path 501, and reproduces data groups B3, B4 and B5 from another L-track by the next scanning (a path 503). In a case where there is no distance (stagger) between the heads 6a and 6b, the operation of the head 6b is similar to that of the head 6a. Thus, by sequentially repeating the scanning, all the effective data recorded in the search data region of the tracks having the same azimuth angle as can be complementarily reproduced by performing two scannings of each of the heads 6a and 6b. This reproduction is possible irrespective of whether there is a stagger or not, and without the phase control of the capstan motor 22.

Next, a case where the magnetic head 6 has heads 6a and 6b which are mounted on the cylinder 20 apart from each other by an angular distance of 180° as shown in FIG. 4C will be described. Herein, it is assumed that the gap length (head width Tw) of the magnetic head 6 is equal to the track pitch Tp. FIG. 4A is a schematic diagram showing the pattern of tracks formed by the magnetic head 6 to which the heads 6a and 6b are mounted with an angular distance of 180° therebetween. FIG. 4B is an enlarged view showing the search data regions shown in FIG. 4A.

In FIG. 4A, paths 504 and 506 show the scanning of the head 6a in the reproduction at a speed 3.5 times the normal reproduction speed, while the paths 505 and 507 show the scanning of the head 6b in the reproduction at a speed 3.5 times the normal reproduction speed. Herein, it is assumed that when each of the head recovers the region of the track with a width more than a half of the track width, the data recorded in the track can be effectively reproduced. Then, the data recorded in the shadowed portions of the tracks in FIGS. 4A and 4C can be effectively reproduced by the scanning of each head.

As can be seen from FIGS. 4A and 4B, in the reproduction at a speed 3.5 times the normal reproduction speed, each of the head 6a (azimuth angle R) and the head 6b (azimuth angle L) certainly scans twice the search data zone within an update cycle S=2×(2N+1)=14 tracks. Similar to the case described with reference to FIGS. 3A and 3B, in the search data zone within the cycle S, all the search data regions of R-tracks have identical search data, while all the search data regions of L-tracks have identical search data. The head 6a can reproduce necessary data from the search data regions of two R-tracks by performing two complementary scannings. Though the head 6b cannot effectively reproduce data from the L-track from only the first scanning (path 505), the head 6b scans the entire search data region of one L-track by the second scanning (path 507). At this time, as shown in detail in FIG. 4B, it is possible to reproduce all the data groups (B1, B2, B3, B4 and B5) of the search data region of the L-track. The scanning order of the heads 6a and 6b may be reversed.

By sequentially repeating the scanning as described above, all the effective data recorded in the search data region can be reliably reproduced by two complementary scannings, or by either one of two scannings.

As described above, in one track set composed of (2N+1) tracks having the same azimuth angle, the search data region of each track is located at the same corresponding position on the track. Since the R-tracks and L-tracks are alternately located, the search data regions for one picture form a search data zone along the direction of tape travel. This allows reliable reproduction of the search data, without being significantly affected by the curves of the tracks.

Next, a case where the gap length (head width Tw) of the magnetic head 6 is larger than the track pitch Tp will be described with reference to FIGS. 5A through 5D. Though the operation of the head 6a will be described as an example, the same operation can be applied to the head 6b. Furthermore, the description herein does not depend on the location or the number of heads.

FIG. 5A schematically shows the track pattern in a case where the head width is equal to the track pitch (Tw=Tp). FIG. 5B is an enlarged view of the search data regions in the track pattern shown in FIG. 5A. FIG. 5C schematically shows the track pattern in a case where the head width is larger than the track pitch (Tw>Tp). FIG. 5D is an enlarged view of the search data regions in the track pattern shown in FIG. 5C.

Now, it is assumed that when the head 6*a* reproduces the region of the track with a width more than a half of the track pitch, the data recorded on the magnetic tape 7 (i.e., with an adequate signal to noise ratio) can be reproduced at an error rate lower than a critical one. In a case where the head width Tw is equal to the track pitch Tp, as shown in FIGS. 5A and 5B, the head 6*a* reproduces data groups A1, A2 and A3 by the first scanning (path 500) and data groups A4 and A5 by the next scanning (path 502).

In a case where the head width Tw is larger than the track pitch Tp, as shown in FIGS. 5C and 5D, the head 6*a* reproduces data groups A1, A2, A3 and A4 by the first scanning (the path 500) and data groups A3, A4 and A5 by the next scanning (the path 502). Thus, the data groups A3 and A4 are reproduced twice. In the data groups A3 and A4, the areas recovered by the head 6*a* are relatively small. As a result, the reproduction output from the head 6*a* is of a lower level. The reliability of data can be improved by increasing the redundancy of the data reproduced from such a search data region with an S/N ratio which is not so high. Furthermore, the speed control of the capstan motor 22 can be performed with a wider range of permissible variations.

As described hereinbefore, in Example 1, the normal data region for use in the normal reproduction and the search data region for use in the variable-speed reproduction are provided within one track, and a standard speed of variable-speed reproduction is set at a speed (N+0.5) times the normal reproduction speed. The same data is recorded in each of the search data regions of the track set of (2N+1) tracks. In the variable-speed reproduction at an (N+0.5) times speed, each of the heads 6*a* and 6*b* scans within the track set twice. Thus, without phase control of the capstan motor 22, a high quality image is obtained in the variable-speed reproduction, by two complementary scannings of one head or either one of two scannings of one head.

Furthermore, by making the head width of the magnetic head 6 (heads 6*a* and 6*b*) larger than the track pitch, the error rate in the reproduced data can be reduced. In addition, speed control of the magnetic tape 7 can have a wider permission range of variations.

Moreover, in the track set of (2N+1) tracks having the same azimuth angle, the search data region of each track is located at the same position on the respective track, and thereby the search data zone is formed along the direction of tape travel. As a result, the data reproduction is unlikely to be affected by the warping of tracks. Thus, the search data can be reliably reproduced.

Additionally, when the standard speed of the variable-speed reproduction is a speed (N+0.5) (N=a natural number) times the normal reproduction speed, the complete search data recorded in the search data region can be reproduced at the variable-speed reproduction at a speed ($N_x$+0.5) ($N_x$: a natural number) times the normal reproduction speed in the range from (−N−0.5) times to (N+0.5) times. Also in the reproduction at a variable reproduction speed other than the above-mentioned one and in a transfer state from one reproduction speed to another, a part of the search data can be reproduced, whereby an image can be displayed.

In Example 1, one track set is made of (2N+1) tracks having the same azimuth angle. However, the same effects can also be obtained when one track set includes more than (2N+1) tracks, though the redundancy increases.

In Example 1, the search data region of each track is located at the same position on the respective track. However, the search data region may be differently located with respect to one track set from another in units of the track set of (2N+1) tracks having the same azimuth angle, as far as each of the search data regions of all the tracks in one track set is located at one specific position on the respective track. For example, it may be located so as not to overlap with the specific regions such as an audio data region determined in accordance with standards.

In Example 1, the case of the magnetic head 6 having two adjacent heads in combination and a case where the magnetic head 6 has two heads spaced with an angular interval of 180° have been described. However, the same effects may be obtained by using a magnetic head having other configurations.

Furthermore, in Example 1, data obtained by dividing and compressing image data of one frame are recorded in the search data regions of the R-tracks and the L-tracks within S=2×(2N+1) tracks. The data recorded in the R-track and that recorded in the L-track are updated at the same time every S tracks. The update position of the data can be arbitrarily determined in each of the search data regions. The update position of the data in the search data region of the R-track may be different from that of the L-track.

Also, in Example 1, the same standard variable reproduction speed is set for the search data region of the R-track and for that of the L-track. However, the standard variable reproduction speed may be different from one search data region to another, whereby the range of the variable reproduction speed can be widened.

In Example 1, the data placed in the search data region of one track set is different from the data placed in the search data region of another track set, each track set being composed of (2N+1) tracks and having a different azimuth angle. However, the same data may be recorded in the search data region of the track having a different azimuth angle. And in this case, the redundancy of the data increases, which may decrease the error ratio.

In Example 1, the data to be recorded in the search data regions of the R and L azimuth angles are divided into five data groups. However, the dividing number may be arbitrarily determined. Thus, the number of data groups in the search data region of the R azimuth angle may be different from that of the L azimuth angle.

In Example 1, the normal reproduction encoder 1 and the searching encoder 2 are separately provided. However, they may be implemented by one device serving both as the normal reproduction encoder 1 and the searching encoder 2.

In Example 1, the normal reproduction data corresponding to a picture of one frame is recorded in ten tracks. However, the number of tracks can be arbitrarily determined and may be different for each frame.

In Example 1, the input signal is a digital video signal obtained by A/D converting an analog video signal. However, the input signal may be data resulting from a digital video signal subject to intra-frame and inter-frame compressions. In this case, it is unnecessary for the normal reproduction encoder 1 to perform the data compressions. The searching encoder 2 may extract intra-frame-compressed data from the input data, so as to generate search data from the extracted data.

In Example 1, a picture is divided into an upper half and a lower half (dividing number M=2). However, the dividing number and the manner of dividing the picture may be arbitrarily selected. For example, the dividing number M may be determined so that the picture is divided into three or more parts. Also, the picture may be divided into a left half and a right half, or into blocks of arbitrary sizes and arbitrary shapes.

Furthermore, in Example 1, only the speed control of the capstan motor 22 is used in the variable-speed reproduction. Additional phase control of the capstan motor 22 may be used so as to improve the variable reproduction speed.

Also, in a case where the position or the like of the search data region is defined by formats and the like, there is no need to use the identification flag indicating that which includes the search data.

EXAMPLE 2

Next, a data recording/reproducing apparatus of Example 2 of the present invention will be described hereinafter with reference to accompanying drawings. The overall configuration of the data recording/reproducing apparatus of Example 2 is similar to that of the data recording/reproducing apparatus 30 (see FIG. 1), and the operations thereof are the same as those described in Example 1. So, the detailed description thereof will be omitted in Example 2.

Figure 6:
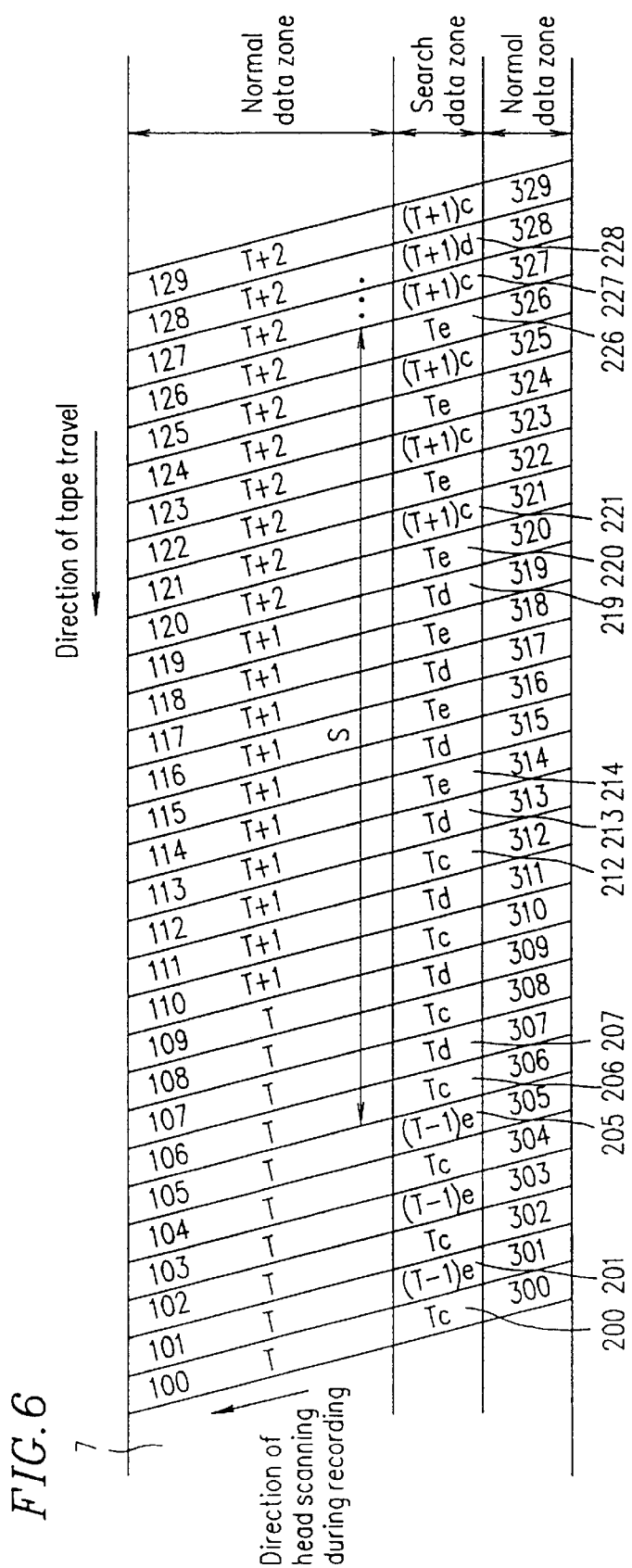
FIG. 6 is a diagram showing the track pattern in Example 2 of the present invention.

In Example 2, the case where image data of an input video signal is recorded after being divided into an odd number of parts is discussed. Hereinafter, a case where the dividing number M=3 will be described as an example. FIG. 6 shows a track pattern formed on the magnetic tape 7 in Example 2. The data placement in the normal data zone is similar to that of Example 1, which will not be described in detail here. Also in Example 2, the standard variable reproduction speed is v=3.5 times the normal reproduction speed (N=3), and the search data is highly compressed image data.

The search data corresponding to image data of one frame is recorded by using the search data regions of M×(2N+1)=21 tracks. Herein, it is possible to record the search data for 21 tracks one after another. For example, in a case of using only the search data regions of the tracks having one azimuth angle, the update cycle of image data is maximum, i.e., 2×M×(2N+1)=42 tracks. Also, in a case where the image data is recorded in a manner similar to Example 1 by using the search data regions of the tracks having different azimuth angles, the cycle of update of a picture (frame) of image data appears on 14 tracks and 28 tracks, alternately. Hence, the cycle of update of image data is not constant. In Example 2, a format is employed in which the cycle of update of the picture is made constant by making the data update position of the R-track and that of the L-track different from each other, and thereby a reproduced picture which is easy to see is realized.

First, image data of one frame is divided into three parts (the dividing number M='3), i.e., upper, middle and lower parts of a picture. Hereinafter, the image data of one frame at a time t is denoted by T, the data obtained by highly compressing the upper part of a picture is denoted by Tc, the data obtained by highly compressing the middle part of a picture is denoted by Td, and the data obtained by highly compressing the lower part of a picture is denoted by Te. The recording of data in the search data region is started at the time t. As shown in FIG. 6, in the search data zone, the data Tc is recorded on every other track from a search data region 200, namely, in (2N+1)=7 tracks of search data regions 202, . . . 212. The data Td is initially recorded in a search data region 207, and similarly on every other track of data regions to a search data region 219. Following the data Tc, the data Te is recorded in every other track from a search data region 214, and is recorded in seven tracks to a search data region 226. This recording process is sequentially repeated. Regarding R-tracks, the search data is updated at every fourteen tracks or at every seven R-tracks (i.e., at search data regions 200, 214, . . . ). While regarding L-tracks the search data is updated at every fourteen tracks or seven L-tracks (i.e., at search data regions 207, 221, . . . ). By thus placing the search data, the cycle of updating a one-frame picture (i.e., the period of tracks since all image data required for one frame are completed until all image data required for next one frame are completed) can be constantly made S=M×(2N+1)=21 tracks, which is equal to the number of tracks required for placing data for a picture of one frame.

EXAMPLE 3

Next, a data recording/reproducing apparatus of Example 3 of the present invention will be described with reference to accompanying drawings. The overall configuration of the data recording/reproducing apparatus of Example 2 is similar to that of the data recording/reproducing apparatus 30 (see FIG. 1), and the operations thereof are the same as those described in Example 1. The detailed description thereof will be omitted in Example 3. In Example 3, similar to Example 1, the image data of an input video signal is recorded after being divided into two parts (dividing number M=2). The data placement in the normal data zone is the same as that of Example 1, and the detailed descriptions thereof will be omitted.

In Example 3, a case where a standard variable reproduction speed v'=N' times (N'=an even number) a normal reproduction speed will be described, for example, N'=4. Furthermore, also in Example 3, the search data is highly compressed data, the data obtained by highly compressing the upper half of image data T of one frame at a time t is denoted by Ta and the data obtained by highly compressing the lower half of image data T of one frame at a time t is denoted by Tb.

Figure 7:
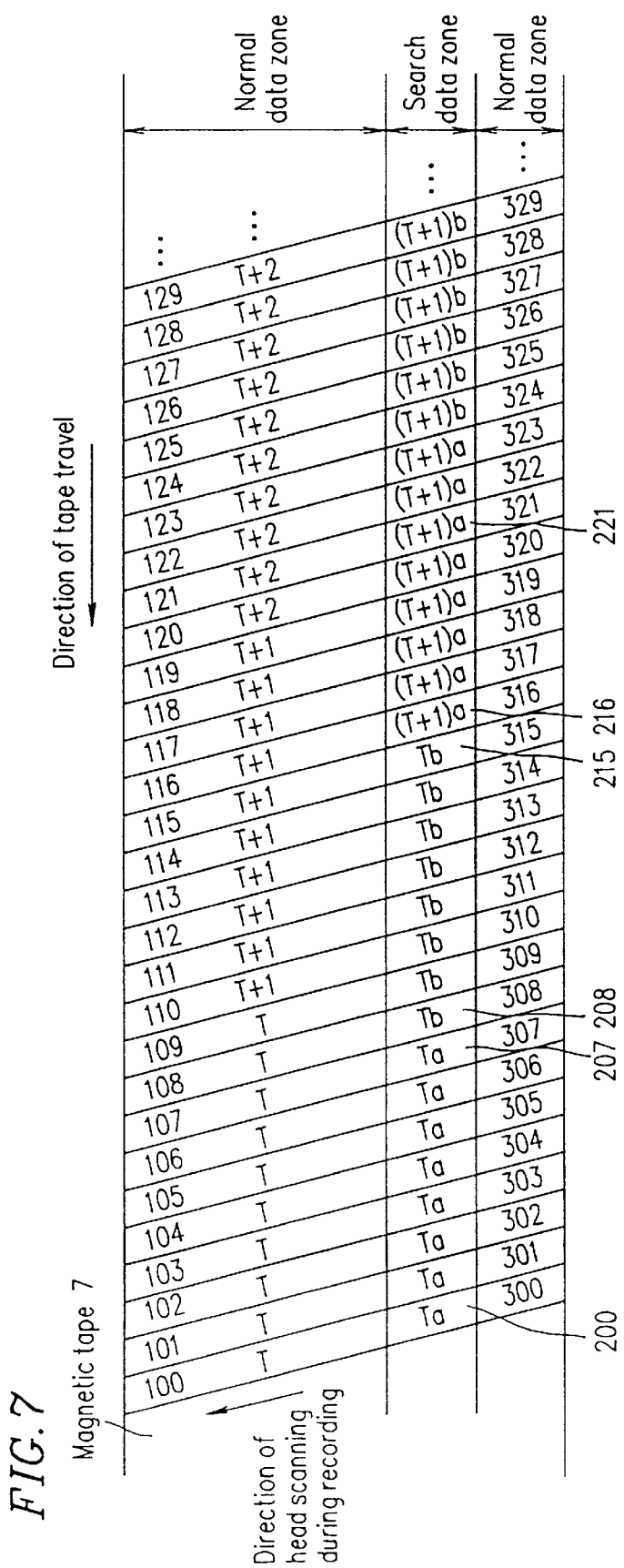
FIG. 7 is a diagram showing the track pattern in Example 3 of the present invention.

FIG. 7 shows a track pattern formed on the magnetic tape 7 in Example 3. In the reproduction at a standard variable reproduction speed v'=4 times (N'=4), the searching encoder 2 outputs the same data while the magnetic head 6 records 2N'=8 tracks. Similar to Example 1, the formatter 3 locates the normal data and the search data regions in each track. The 2N'=8 tracks having the same azimuth angle form one track set on the magnetic tape 7.

In each track set, the search data regions for recording the same search data are placed at the same corresponding position in each track and recorded at the same position in the corresponding track of the magnetic tape 7. Accordingly, the search data regions included in one track set are located along the direction of tape travel of the magnetic tape 7, thus forming a search data zone. This search data zone can be arbitrarily located by the track set composed of 2N'=8 tracks. For example, in a case where a audio signal region is previously reserved on the track, the search data zone may be located so as not to overlap with this region.

As shown in FIG. 7, the formatter 3 places normal reproduction data into normal data regions 100 through 120 and 300 through 329, and places search data into search data regions 200 through 229. Herein, since the dividing number M=2, the search data for one frame is recorded by using M×N'=2×2×8=16 tracks.

In the search data zone, the data Ta generated from the upper half of the image data T at a time t is recorded in search data regions 200 through 207 of successive eight tracks. Then, the data Tb generated from the lower half of the image data T at a time t is recorded in the search data regions of 208 through 215 of successive eight tracks. This recording process is sequentially repeated. Thus, the search data for image data of one frame is placed by using the search data regions of 2×2×N'=16 tracks.

Next, a method for reproducing image data from the search data region will be described with reference to FIGS. 8A through 8C. In Example 3, the magnetic head 6 has two heads 6a and 6b which are mounted on the cylinder 20 with an angular distance of 180° therebetween. Herein, it is assumed that the gap length (head width Tw) of the magnetic head 6 is equal to the track pitch Tp.

FIG. 8A is a schematic view showing the track pattern formed by the magnetic head 6 having heads 6a and 6b mounted with an angular distance of 180° therebetween. FIG. 8B is an enlarged view of the search data regions shown in FIG. 8A.

In FIG. 8A, paths 508 and 510 show the scanning of the head 6a in the variable-speed reproduction at a speed four times the normal reproduction speed, while paths 509 and 511 show the scanning of the head 6b in the variable-speed reproduction at a speed four times the normal reproduction speed. Herein, it is assumed that the data recorded on a target track can be effectively reproduced when each of the heads recovers the region with a width more than a half of the track width. In this case, the data recorded in shadowed portions of the tracks shown in FIGS. 8A and 8B is effectively reproduced by the scanning performed by each head.

As can be seen from FIGS. 8A and 8B, in the reproduction at a speed four times the normal speed, each of the head 6a (azimuth angle R) and the head 6b (azimuth angle L) certainly scans once the search data zone within an update cycle S'=2N'=8 tracks. In the search data zone within the cycle S', all the search data regions of all tracks have identical data. Consequently, by two complementary scannings performed by the heads 6a and 6b, or by one scanning performed by the head 6a or 6b, necessary data can be effectively reproduced. By repeating such scannings one after another, all the data recorded in the search data regions can be effectively reproduced by the heads 6a and 6b, without the phase control of the capstan motor 22.

In a case where the gap length of each head of the magnetic head 6 (head width Tw) is larger than a track pitch Tp, as already described in Example 1, the reliability of data can be improved by increasing the redundancy of the data reproduced from the search data region where an area recovered by each head is relatively small and of which reproduction output from the head is of a low level. Moreover, a permissible range of variation in the speed control of the capstan motor 22 can be widened.

As described hereinbefore, the normal data region for use in the normal reproduction and the search data region for use in the variable-speed reproduction are provided within one track, and a standard variable reproduction speed is set at a speed N' (N'=an even number) times the normal reproduction speed. The same data is recorded in each of the search data regions of the track set of successive 2N' tracks, thereby forming a search data zone. In the variable-speed reproduction at a speed N' times the normal reproduction speed, each of the heads 6a and 6b having different azimuth angles scans once the search data zone within the track set. Thus, by utilizing two complementary scannings of these two heads or one scanning of either head, all the effective data in the search data regions can be reproduced. As a result, a high quality image is realized in the variable-speed reproduction.

Additionally, when the standard speed of the variable-speed reproduction is a speed N' (N'=an even number) times the normal reproduction speed, the complete search data recorded in the search data regions can be reproduced by causing each of the heads 6a and 6b to scan at least once the search data zone of one track set, at the variable-speed reproduction at a speed $N'_x$ ($N'_x$=an even number) times the normal reproduction speed in the range from -N' times to N' times. Also in the reproduction at a variable reproduction speed other than the above-mentioned one and in a transfer state from one to another variable reproduction speed, a part of the search data can be obtained, allowing a picture to be displayed.

Furthermore, in Example 3, the search data region of each track is located at the position corresponding to the same position on the track for all the tracks. However, the search data region may be arbitrarily located, as far as each of the search data regions of all the 2N' tracks in one track set are located at one specific position in the respective track. For example, it may be located so as not to overlap with the specific regions such as an audio data region determined in accordance with standards.

In Example 3, one track set includes successive 2N' tracks. However, the same effects can also be obtained when one track set includes more than 2N' tracks, though it results in an increase of the redundancy.

Furthermore, in Example 3, only the speed control of the capstan motor 22 is used for the variable-speed reproduction. Additional phase control of the capstan motor 22 may be used so as to improve the variable reproduction speed.

EXAMPLE 4

A data recording/reproducing apparatus of Example 4 of the present invention will be described with reference to accompanying drawings. FIG. 9 shows a block diagram showing an overall configuration for the data recording/reproducing apparatus 40 of Example 4. The components corresponding to those of the data recording/reproducing apparatus 30 of Example 1 are denoted by the same reference numerals, and the descriptions thereof will be omitted. The searching encoder 2, the searching decoder 12 and the standard variable reproduction speed of Example 1 will be referred to as a first searching encoder 2, a first searching decoder 12 and a first standard variable reproduction speed, respectively, in Example 4, in order to distinguish the components of Example 4 from those of Example 1. The data placement in the normal data zone is also similar to that of Example 1 and will not be described here.

As shown in FIG. 9, the data recording/reproducing apparatus 40 includes a second searching encoder 14 in addition to the first searching encoder 2, and a second searching decoder 15 in addition to the first searching decoder 12.

The data recording/reproducing apparatus 40 has a normal reproduction mode for reproducing data at a normal speed, a first search mode for reproducing data at a first standard reproduction speed, and a second search mode for reproducing data at a second standard reproduction speed. Hereinafter, the operations of the data recording/reproducing apparatus 40 will be described. For simplicity of description, a case where the first standard reproduction speed $v_1$=N+0.5=3.5 times (N=3) the normal reproduction speed and the second standard reproduction speed $v_2$=N+0.5=6.5 times (N=6) will be explained as an example. The first standard reproduction speed $v_1$ corresponds to the first search data region (first search data zone) shown in FIG. 10, while the second standard reproduction speed $v_2$ corresponds to the second search data region (second search data zone) shown in FIG. 10. The data placement in the first search data zone is the same as that of Example 1.

When data is recorded, the second searching encoder 14 generates search data from an input video signal and outputs it to the formatter 3. The search data is, for example, data generated by more highly compressing the input digital video signal than the normal reproduction encoder 1 which allows it to reproduce a picture from a small amount of data. With respect to the second standard variable reproduction speed $v_2$=6.5 times (N=6), while each of the heads 6a and 6b is recording data in the second search data regions of (2N+1)=13 tracks, the second searching encoder 14 outputs the same data to each of the two heads. These (2N+1) tracks form one track set.

Herein, in order to reduce the search data regions, the image data of one frame may be recorded after being divided into M portions. With respect to the image data to be recorded in the second search data region, the picture may be divided into upper and lower halves where the dividing number M=2. In such a case, a method for generating the search data in the second search data region is similar to that described in Example 1. Data Tx and data Ty, which are obtained by compressing the upper and lower halves of the image data T, respectively, are recorded in the second search data region with respect to image data T of one frame at a time t.

Figure 10:
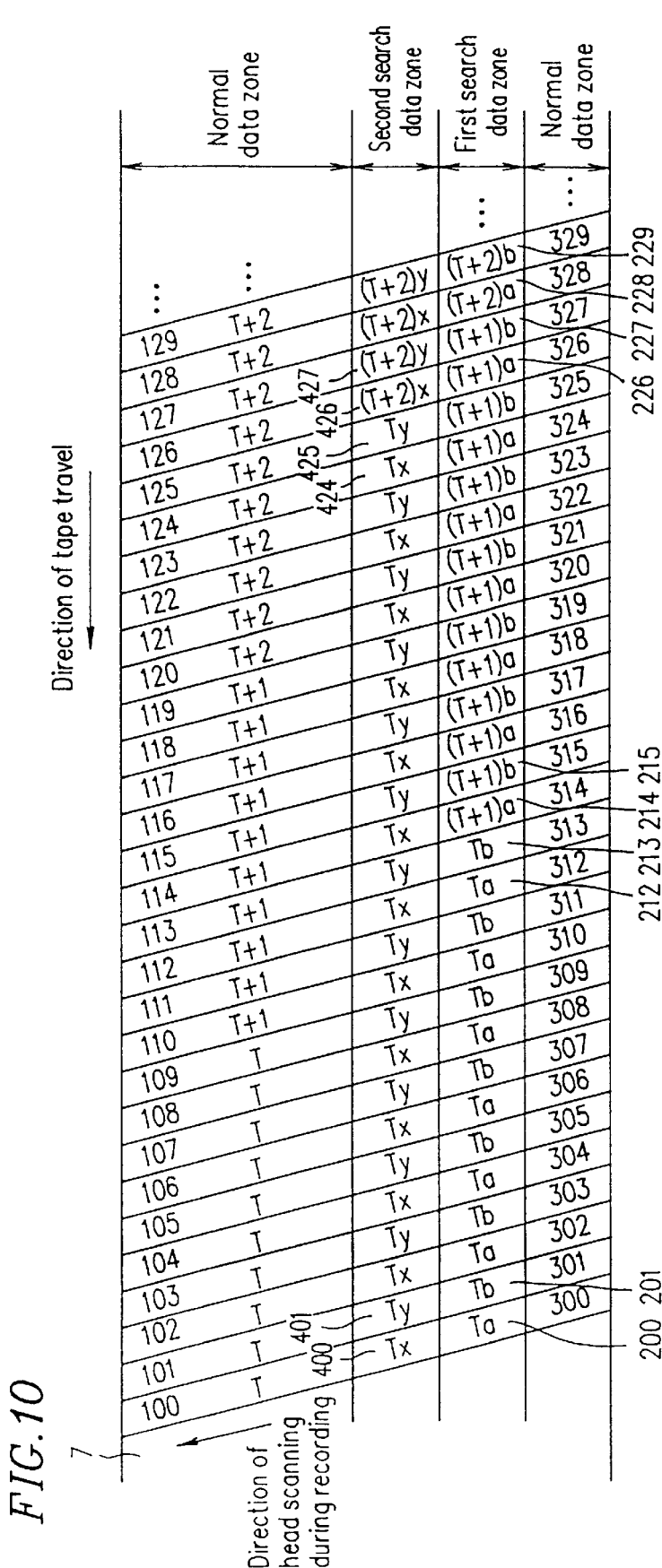
FIG. 10 is a diagram showing the track pattern in Example 4 of the present invention.

FIG. 10 shows a track pattern formed on the magnetic tape 7 in Example 4. The formatter 3 places the normal reproduction data into normal data regions 100 through 129 and 300 through 329 as shown in Example 4, search data for the reproduction at the first standard variable reproduction speed $v_1$ into first search regions 200 through 229, and search data for the reproduction at the second standard variable reproduction speed $v_2$ into second search data regions 400 through 429.

Similar to Example 1, two track sets are formed by selecting (2N+1)=13 tracks at every other track. In one track set (i.e., even numbered tracks of 400, 402, . . . 424 shown in FIG. 10), the same data Tx is repeatedly recorded in the second search data region. Similarly, in the other track set (i.e., odd numbered tracks of 401, 403, . . . 425 shown in FIG. 10), the same data Ty is repeatedly recorded in the second search data region. Accordingly, an update cycle S of the image data recorded in the second search data regions is represented by S=M×(2N+1)=26 tracks in the number of tracks recorded on the magnetic tape 7.

Herein, the second search data region and the search data for the second search data region can be set independently of the first search data region and the search data for the first search data region, as far as the first and second search data regions recorded on the same track do not overlap with each other. That is, a standard variable reproduction speed, the size and position of the region, a manner of compressing data, a rate at which the data is compressed and the like will be arbitrarily set for the second search data region. For example, the data Tx and Ty to be recorded in the second search data region may be compressed in a manner different from that for the data Ta and Tb recorded in the first search data region. Also, the manner of dividing a picture of image data of one frame into a plurality of parts and the dividing number may be different.

In this way, search data having the image quality and the update cycle most suitable for the first standard variable reproduction speed $v_1$ can be placed in the first search data region, whereas search data having the image quality and the update cycle most suitable for the second standard variable reproduction speed $v_2$ can be placed in the second search data region.

Next, the operations of the data recording/reproducing apparatus 40 will be described with reference to FIG. 9 again. The data recorded on the magnetic tape 7 is reproduced by the magnetic head 6. The reproduced data is demodulated by the demodulator 8, and is subject to the error correction in the error correction decoder 9. Thereafter, in the deformatter 10, the reproduced data is divided into the normal reproduction data and two kinds of search data. The normal reproduction data is decoded by the normal reproduction decoder 11. The search data is decoded by the first searching decoder 12 or the second searching decoder 15, in accordance with its kind. The switch 13 selects an output of the normal reproduction decoder 11 for normal reproduction, whereas it selects an output of the first searching decoder 12 and an output of the second searching decoder 15 for reproduction at the first standard variable reproduction speed $v_1$ and for reproduction at the second standard variable reproduction speed $v_2$, respectively. The selected output is output.

In the above-mentioned case, one search data region is provided in one area of the track. However, one search data region may be divided into a plurality of portions so that they are located at a plurality of positions within one track.

FIG. 11 shows a case where the first data region of Example 4 is divided into two portions and located in one track. Herein, the data Ta, obtained by highly compressing the upper half of the image data T of one frame at a time t, is divided into two parts, whereby data Ta1 and data Ta2 are generated. Similarly, for the next track, the data Tb, obtained by highly compressing the lower half of the image data T of one frame at a time t, is divided into two parts, whereby data Tb1 and data Tb2 are generated. The data Tb1 and Tb2 are respectively recorded in two divisional portions of the first search data region in one track. The data Ta1 and Ta2 are recorded in the first search data region of every other track of (2N+1)=7 tracks, for example, the track numbered by an even number in FIG. 11. The data Tb1 and Tb2 are recorded in the first search data region of every other track of (2N+1)=7 tracks, for example, the track numbered by an odd number in FIG. 11. Likewise, data (T+1)a1 and (T+1)a2 are obtained by dividing image data (T+1)a into two parts, the image data (T+1)a being obtained by highly compressing the upper half of the image data (T+1) of one frame at a time (t+1). Data (T+1)b1 and (T+1)b2, obtained by dividing image data (T+1)b into two parts, the image data (T+1)b being obtained by highly compressing the lower half of the image data (T+1) of one frame at a time (t+1). The data (T+1)a1, (T+1)a2, (T+1)b1 and (T+1)b2 are sequentially placed in the first search data region divided into two portions within each track.

Also in the case of such a data placement, similar to that described in Example 1, irrespective of location of the head, all the data within the search data regions can be effectively reproduced by two complementary scannings of the heads 6a and 6b or by either one of the two scannings. As discussed above, one search data region need not be located at one position within one track. The location of the search data region in the track can be arbitrarily determined, as far as the location corresponds to the same position with respect to all the tracks included in one track set. Of course, it is possible to locate a plurality of search data regions at a plurality of positions within the track.

Also, a manner of dividing the search data region in one track can be arbitrarily selected for each track set. The divisional portions of the search data region may be of different sizes for one track set from another.

The number of divisional portions may be different for one track set from another. For example, the search data region can be divided into three portions or more.

In Example 4, the first search data region and the second search data region are independent of each other. However, the search data may be reproduced from a plurality of search data regions each of which records different data, in a case of variable-speed reproduction at a relatively low speed, so as to improve qualities of the reproduced image. For example, two kinds of standard speeds for variable-speed reproduction are set at $v_1=N_1+0.5$ and $v_2=N_2+0.5$ ($N_1>N_2$). In the first search data region corresponding to the standard variable reproduction speed $v_1$, a DC component included in the compressed data obtained by using discrete cosine transform may be placed. In the second search data region corresponding to the standard variable reproduction speed $v_2$, an AC component included in the compressed data obtained by compressing image data by discrete cosine transform may be placed. In this case, when variable-speed reproduction is performed at a higher speed, a picture is reproduced using only the DC component recorded in the first search data region. On the other hand, variable-speed production is performed at a relatively low speed, a picture is reproduced by using both of the DC and AC components in the compressed data from the first and second search data regions, so as to improve the image quality of the reproduced picture.

Alternatively, it is possible to set the same standard variable reproduction speed for a plurality of search data regions so that one identical search data may be recorded therein. Thus, the redundancy of the search data can be increased, and the error ratio decreases. Also, it is possible to set the same standard variable reproduction speed for a plurality of search data regions which record different search data (e.g., DC and AC components of the compression image data obtained by discrete cosine transform).

In Example 4, one track set can be composed of more than (2N+1) tracks having the same azimuth angle similar to Example 1. Also, data can be reproduced at a speed where the absolute value is equal to or less than the standard variable reproduction speed. In dividing image data of one frame into a plurality of parts, the number of the parts and a manner of dividing can be arbitrarily determined. The update position of data, the standard variable reproduction speed or the like for the search data region of the R azimuth angle may be different from those for the search data region of the L azimuth angle. The variable reproduction speed can be improved by performing phase control on the capstan.

EXAMPLE 5

A data recording/reproducing apparatus of Example 5 of the present invention will be described with reference to the accompanying drawings. The data recording/reproducing apparatus of Example 5 can reproduce data at a very high speed. The overall configuration of the data recording/reproducing apparatus is similar to that of the data recording/reproducing apparatus 30 of Example 1 (see FIG. 1), and the operations thereof are similar to those described for Example 1. So, the detailed description thereof will be omitted here.

Figure 12:
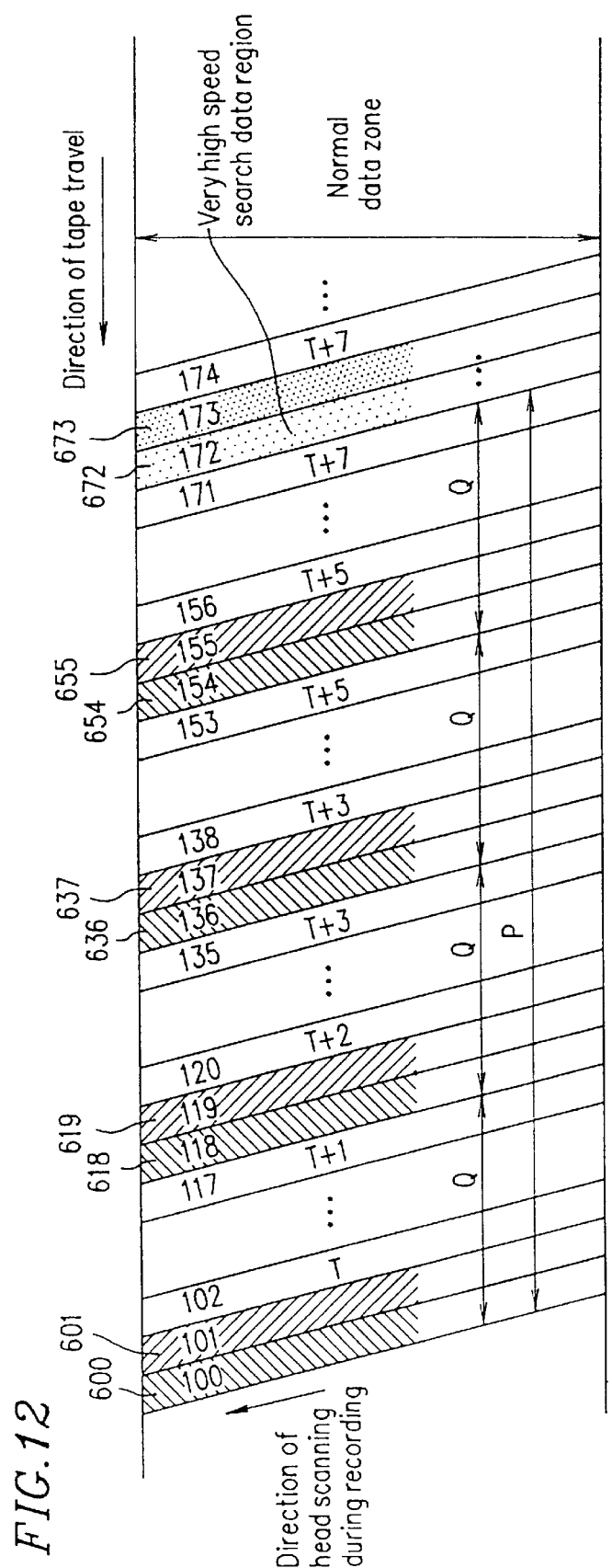
FIG. 12 is a diagram showing the track pattern in Example 5 of the present invention.

FIG. 12 shows a track pattern for performing the very high speed reproduction of the data recording/reproducing apparatus of Example 5. Hereinafter, a case where a variable reproduction speed K=36 times the normal reproduction speed will be described as an example.

In Example 5, very high speed search data regions are provided within the normal data zone. As can be seen from FIG. 12, a pair of two adjacent tracks having azimuth angles different from each other (hereinafter, referred to as a "pair track") are selected at predetermined track intervals of Q. Very high speed search data is recorded by using portions (e.g., 600 and 601) of the normal data regions (e.g., 100 and 101) of the pair track. The portions have a length which is equal to or more than a half of the track length. The data recorded in the very high speed search data region of each pair track is different. With respect to the variable reproduction speed K, the track interval Q between two tracks where the very high speed search data regions are located is set at Q=K/2=18 tracks (Q=an even number). The same very high speed search data is located for each of J pair tracks (J=the number of pair tracks). That is, the very high speed search data regions of J pair tracks of the R azimuth angle (R-tracks) have identical data, while the very high speed search data regions of J pair tracks of the L azimuth angle (L-tracks) have other identical data. In Example 5, two heads 6a and 6b having different azimuth angles are used, and the very high speed search data region has a length which is equal to or more than a half of the track length. Thus, J is set to be 4. In the case where a track cycle P=4Q=72 tracks, four R-tracks (J=4) having the same very high speed search data and four L-tracks (J=4) having the same very high speed search data are located within one track cycle P. The track cycle P is an update cycle of the very high speed search data on the magnetic tape 7.

The very high speed search data is generated and placed on the track in the following manner. First, the image data T of one frame at a time t is highly compressed and divided into a plurality of minute block data. The block data is repeatedly recorded in the very high speed search data region in predetermined units.

Based on the maximum length of data allowing the data to be reliably read by the magnetic head in one scanning at a reproduction speed of K times the normal reproduction speed, the unit of repetition is determined so as to be less than the maximum length. The formatter 3 adds an identification flag indicating that the data is very high speed search data.

For example, in a case of K=36 times, the block data having a data length less than the data length assuring the data reproduction is referred to as D1. The block data D1 is repeatedly placed in a very high speed search data region 600 of a track 100. The block data D1 is, for example, the first block data from the top of the picture, which is generated from the image data of one frame. On the magnetic tape 7, the very high speed search data region 600 having a length equal to or more than a half of the track length is padded with the block data D1 recorded several times. Similarly, a very high speed search data region 601 is padded by repeatedly recording block data D2 which is the second block data from the top of the picture. Next, very high speed search data regions 618 and 619, which are apart from the very high speed search data regions 600 and 601 by intervals of Q=18 tracks, are padded with the block data D1 and D2, respectively. Similarly, per Q=18 tracks, very high speed search data regions 636 and 654 are padded with the block data D1, while regions 637 and 655 are padded with the block data D2. In this way, within one track cycle P=4Q=72 tracks, each of the block data D1 and D2 is placed in the very high speed search data regions of four tracks. In the next track cycle, very high speed search data regions 672 and 673, . . . are padded by repeatedly recording block data D3 and D4, which are the third and fourth sets of data of the picture. This procedure is sequentially repeated.

For example, in a case where image data of one frame is divided by the dividing number M'=50, and the divided block data is placed in the very high speed search data regions, the very high speed search data recorded on M'×P/2=2M'×Q=1800 tracks constitute a picture of one frame.

The normal reproduction data is placed in the portion of the normal data region excluding the very high speed search data region. The image data of one frame for normal reproduction is not necessarily recorded by using ten tracks. For example, in a case where image data includes both of the intra-frame compressed data and inter-frame compressed data, the number of tracks for recording the image data of one frame is not required to be constant.

Figure 13:
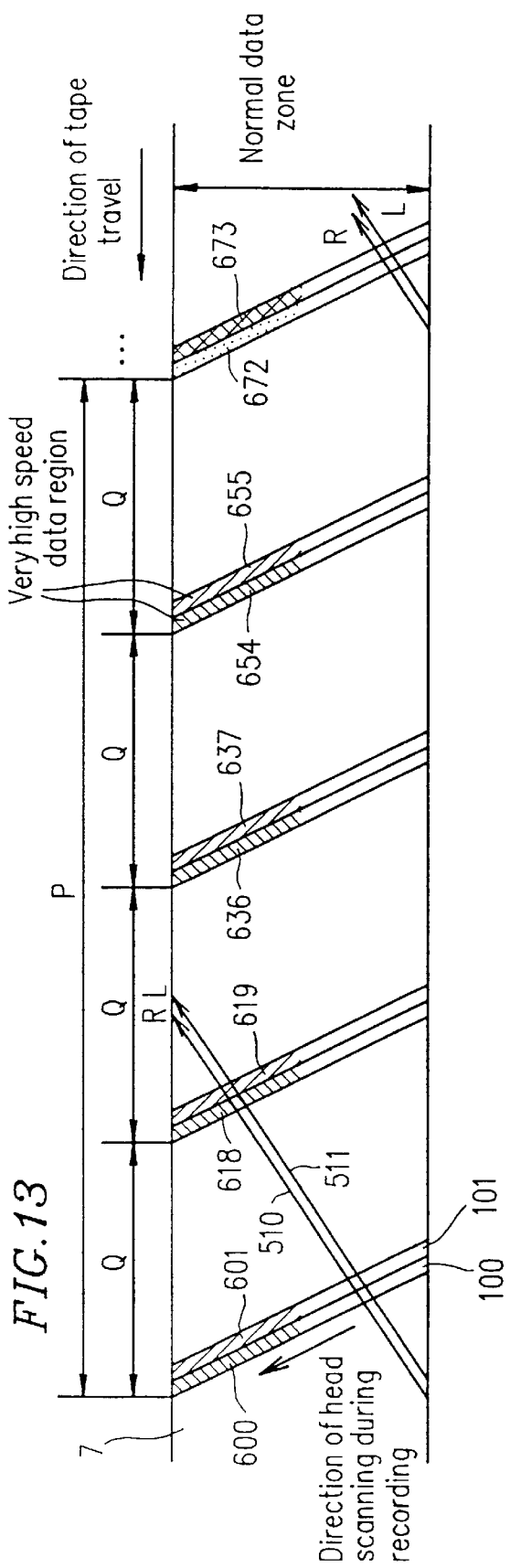
FIG. 13 is a schematic diagram showing the track pattern of the present invention in a case of using a combination head in Example 5.

Next, the operations in the very high speed reproduction will be described. First, a case where the magnetic head 6 is a combination head having two heads 6a (azimuth angle R) and 6b (azimuth angle L) mounted on the cylinder 20 so as to be adjacent to each other will be described. FIG. 13 schematically shows the track pattern in this case. The scannings of the heads 6a and 6b at a speed 36 times the normal reproduction speed are shown by paths 510 and 511, respectively.

As shown in FIG. 13, in the reproduction at the 36 times speed, with respect to each track cycle P (P=2K=72 tracks), each of the heads 6a and 6b certainly scans the very high speed search data region located within the cycle P once. Accordingly, by one scanning of the magnetic head 6, without the phase control of the capstan motor 22, the block data recorded in the very high speed search data region placed at track intervals of Q=K/2=18 and having a length equal to or more than the track length can be reliably reproduced. This process is sequentially performed, whereby all the image data of one frame, recorded in the very high speed search data regions, can be reproduced. Thus, the variable-speed reproduction assuring a high quality image is realized. Herein, when there is a distance (stagger) between the heads 6a and 6b, each of the heads 6a and 6b certainly scans the very high speed search data region once with respect to P=2K=72 tracks. Consequently, all the data recorded in the very high speed search data regions can be effectively reproduced.

Figure 14:
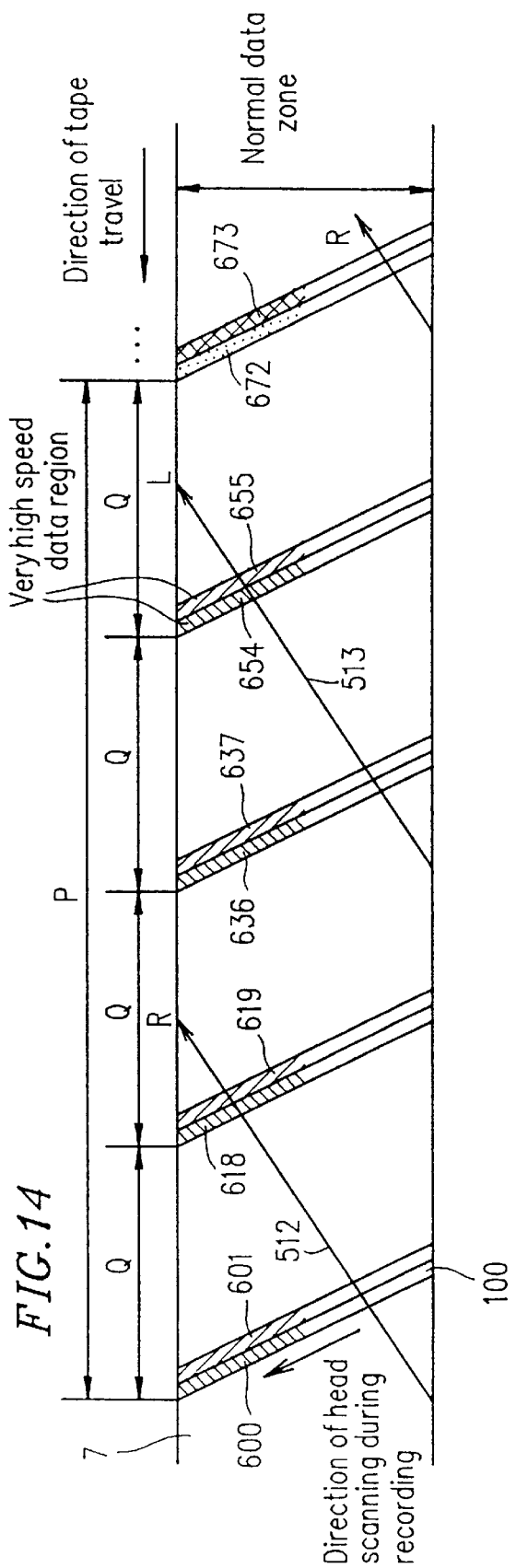
FIG. 14 is a schematic diagram showing the track pattern in Example 5 of the present invention in a case of using a head having two heads set apart from each other by an angular distance of 180°.

Next, referring to FIG. 14, a case where the magnetic head 6 has heads 6a and 6b mounted on the cylinder 20 with an angular distance of 180° therebetween will be described. FIG. 14 schematically shows the track pattern formed in this case. The scannings of the heads 6a and 6b in the variable-speed reproduction at the 36 times speed are shown by paths 512 and 513.

As shown in FIG. 14, in the reproduction at the 36 times speed, the very high speed search data region located within the cycle P is certainly scanned once by each of the heads 6a and 6b. Accordingly, by one scanning of the magnetic head 6, without the phase control of the capstan motor 22, the block data recorded in the very high speed search data region placed at track intervals of Q=K/2=18 tracks and having a length equal to or more than a half of the track length can be reliably reproduced. This process is sequentially performed, whereby all the image data of one frame, recorded in the very high speed search data regions, can be reproduced. Thus, variable-speed reproduction assuring high picture quality is realized.

Figure 15:
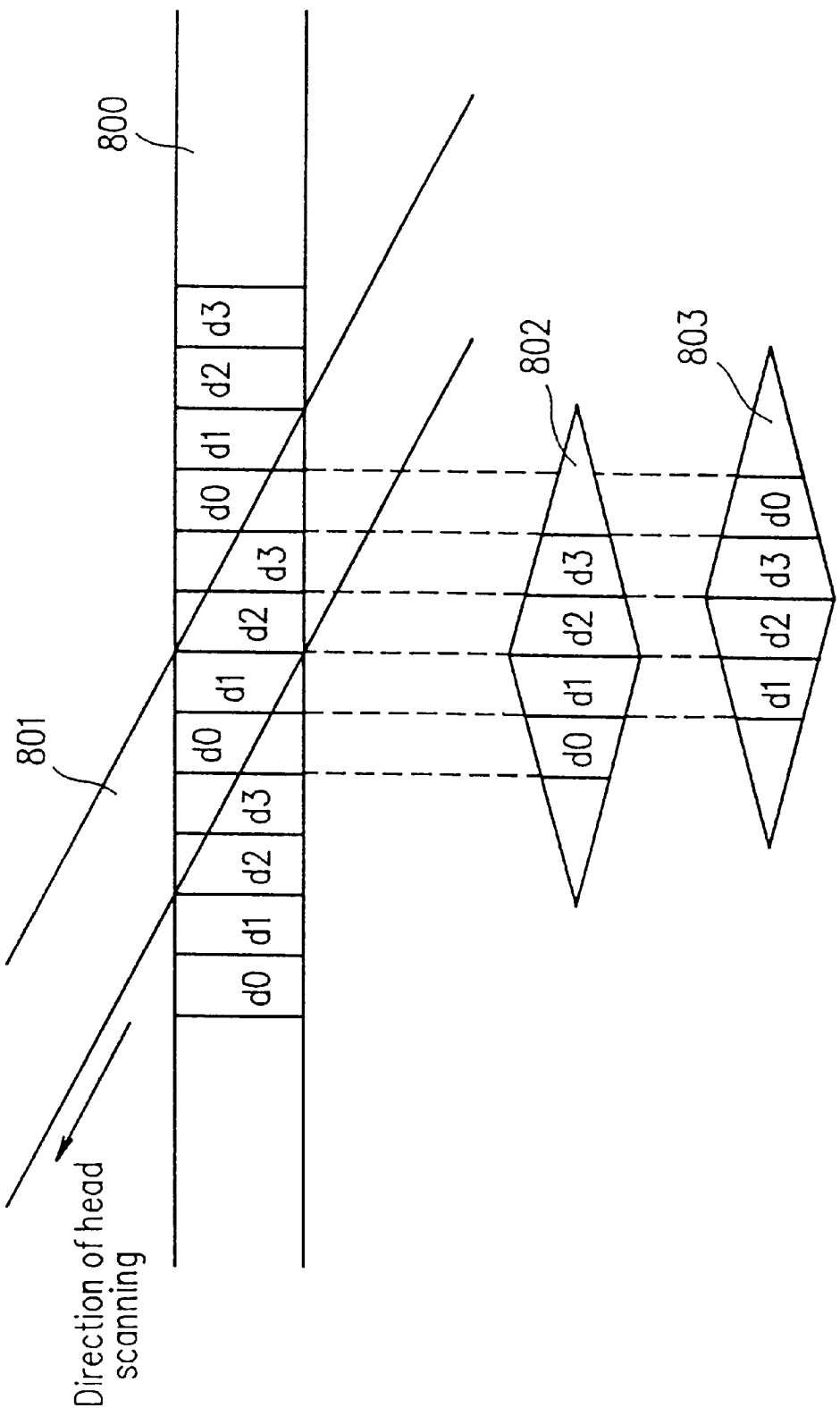
FIG. 15 is an enlarged view showing the track pattern in Example 5 of the present invention.

FIG. 15 schematically shows output data reproduced when the magnetic head 6 crosses the track in the very high speed reproduction. The reference numeral 800 denotes a track, 801 denotes a path formed by the magnetic head 6 (head 6a or 6b) when the magnetic tape is scanned, 802 and 803 denote outputs reproduced from the track 800. The width of the path 801 is the head width, which is equal to the track pitch in Example 5.

A case where the standard very high speed reproduction speed K=36 times will be discussed. The block data (for example, D1) has a length less than the maximum length allowing the data to be reliably reproduced, and is repeatedly recorded in the very high speed search data region of the track 800. The block data D1 is divided into a several (four, in a case of Example 5) data groups (d0, d1, d2 and d3) so that each data group is recorded into a sync block for very high speed search data. The size of the sync block for very high speed search data is not required to be the same as that of the sync block for the search data, normal reproduction data or the like, described in Example 1.

In a case where the magnetic head 6 scans as shown by the path 801, data can be reproduced at an error rate lower than a predetermined rate when the magnetic head 6 recovers more than a half of the track width (track pitch), i.e., with an adequate signal to noise ratio. In this case, as shown in FIG. 15, all the data groups of d0, d1, d2 and d3 of the data D1 can be obtained from a reproduction output 802 of the magnetic head 6. Also, in a case where the scanning path 801 of the magnetic head 6 deviates rightward in FIG. 15, the reproduction output of the magnetic head 6 becomes as shown at 803. Even in this case, since all the data of data groups of d0, d1, d2 and d3 can be obtained, the block data D1 can be completely reproduced. Also in a case where the scanning path 801 of the magnetic head 6 deviates leftward, the block data D1 can be completely reproduced, and the same operation can be applied.

Thus, by using block data repeatedly placed for each predetermined length, at the standard very high speed reproduction speed K=36 times, all the data of the block data can be effectively reproduced without the phase control of the capstan motor 22. Also in the case of the combination head composed of heads 6a and 6b arranged adjacent to each other, irrespective of the distance (stagger) between the heads 6a and 6b, the data of the very high speed search data region can be reliably obtained. As a result, without depending on the arrangement of the heads, all the effective data can be obtained. Example 5 has been described for the case where the head width of the magnetic head 6 and the track pitch are the same. While in the case where the magnetic head 6 having a head width more than the track pitch is used, data can be reproduced from a region having a length more than the standard length, and the permission range of variation in the speed control for the magnetic tape 7 can be widened.

As described hereinbefore, the very high speed search data region having a length equal to or more than half of the track length is provided for each track cycle of Q=K/2 tracks. This makes it possible to reproduce all the effective data in the very high speed search data region at a reproduction speed 36 times the normal reproduction speed, without depending on the number or arrangement of the heads.

Also, the very high speed search data region is sufficient if it has a length equal to or more than half of the track length, and can be located at an arbitrary position on the track, in units of J very high speed search data regions having the same data. For example, it can be located so as not to overlap with the specific regions such as an audio signal region determined in accordance with standards.

In Example 5, at the standard very high speed reproduction speed K=36 times, the very high speed search data regions are formed at intervals of tracks Q=K/2=18 tracks, and the cycle P of update of image data is set at 4Q. When the cycle of updating image data can be set longer, the track cycle P is set to be longer.

This allows the number J of the very high speed search data regions having the same data and located within the track cycle P to be more than four.

According to the format of Example 5, eight very high speed search data regions are provided for 144 (=2P) tracks. For example, where a track cycle P'=2P=144, the track interval Q=K/2=18, and J=4 (J=the number of very high speed search data regions having the same data), the number of very high speed search data regions required for 144 tracks is only 4. Thus, by expanding the track cycle P and placing J very high speed search data regions at intervals of Q tracks, the area on the track used for the very high speed search data region can be reduced, which allows the area for the normal reproduction region to increase.

In addition, when the number J of the very high speed search data regions having the same data is set at equal to or more than 5, three of the intervals between these very high speed search data regions may be Q tracks, with the remaining intervals being different from Q tracks. This makes it possible to increase the number of reproduction speeds available for variable-speed reproduction.

Also, in a case where J=4, if the very high speed search data region has a length equal to or more than a half of the track length, as described hereinafter, all the effective data can be obtained at a reproduction speed higher than the standard very high speed reproduction speed K.

In a case where the track length is 1, and the length of the very high speed search data region is X ($1 > X \geq \frac{1}{2}$), the range of reproduction speeds V allowing all the data to be effectively reproduced without the phase control of the capstan motor 22 is: in positive direction variable-speed reproduction;

$$Q/(X+Y)+1 \leq V \leq Q/(1-X+Y)+1$$

in negative direction variable-speed reproduction;

$$-Q/(1-X+Y)+1 \leq V \leq -Q/(X+Y)+1$$

where, Y=0, 1, 2, . . . . With respect to all the speeds V obtained for each Y, in the range of speeds as expressed by the above formulae, all the data in the very high speed search data region can be effectively reproduced.

For example, in a case where the track interval Q=K/2=18, and X=0.6, the range of speeds allowing the data reproduction is:

in positive direction variable-speed reproduction;

$$31 \leq V_0 \leq 46 \text{ (when Y=0)}$$

$$12.25 \leq V_1 \leq 13.86 \text{ (when Y=1)}$$

$$7.92 \leq V_2 < 8.5 \text{ (when Y=2)}$$

$$Q/(X+i)+1 \leq V_i \leq Q/(1-X+i)+1 \text{ (when Y=i)}$$

in negative direction variable-speed reproduction;

$$-44 \leq V'_0 \leq -29 \text{ (when Y=0)}$$

$$-11.86 \leq V'_1 \leq -10.25 \text{ (when Y=1)}$$

$$-6.5 \leq V'_2 \leq -5.92 \text{ (when Y=2)}$$

$$-Q/(1-X+i)+1 \leq V'_i \leq -Q/(X+i)+1 \text{ (when Y=i)}$$

Consequently, the range of speeds allowing the effective reproduction of all the data in the very high speed search data region is expressed by: $V=(V_0$ or $V_1$ or $V_2$ or . . . or $V_i$ or $V'_0$ or $V'_1$ or $V'_2$ or . . . or $V'_i$) times the normal reproduction speed.

In Example 5, the very high speed search data regions are provided in the pair track, i.e., a pair of tracks having azimuth angles different from each other. However, the very high speed search data region is not necessarily required to be provided in each track of the pair track. At least four very high speed search data regions may be provided in the tracks having one azimuth angle and included in the track cycle P at intervals of Q tracks, so that the same block data is placed in each of the high speed search data regions.

Also, it is possible to provide at least four very high speed search data regions at intervals of Q tracks (Q=an even number) for each two tracks not constituting the pair track (i.e., not adjacent to each other) and having different azimuth angles, and place the same block data in each of the high speed search data regions. By such an arrangement, the same effects as those of Example 5 can be obtained.

In Example 5, the update position of the block data to be recorded in the high speed search data region is the same for both of the R-tracks and L-tracks. However, the update position of the block data for the track of one azimuth angle may be different from that for the track of another azimuth angle. By shifting the update position of the block data according to the azimuth angles of the tracks, for example, in a case where the picture dividing number M' is an odd number, the update cycle of image data can be made constant, similarly to Example 2 for the high speed search data region.

Furthermore, with respect to the standard very high speed reproduction speed, different speeds may be set for the very high speed search data regions of the R-track and for those of the L-track. By setting the track interval Q between the very high speed search data regions located in the R-tracks to be different from that between the very high speed search data regions located in the L-tracks, all the data in the very high speed search data regions can be effectively obtained at a plurality of very high speed reproduction speeds. This widens the speed range of variable-speed reproduction.

In Example 5, a picture of one frame is divided into blocks. The dividing direction may be the vertical direction or the horizontal direction, and the blocks may have arbitrary shapes and sizes. The picture dividing number may be arbitrarily determined, and the picture dividing number for one frame may be different from that for another frame. In Example 5, the picture of one frame is compressed after being divided. Alternatively, it is possible to divide the image data after being compressed.

In Example 5, one block data is divided into four data groups. The number of data groups constituting one block data can be arbitrarily determined. The number of data groups may be changed in each frame, depending on whether the corresponding track is the R or the L-track, or in the very high speed search data regions of each track.

EXAMPLE 6

A data recording/reproducing apparatus of Example 6 of the present invention will be described with reference to accompanying drawings. The data recording/reproducing apparatus of Example 6 has a normal reproduction mode for reproducing data at a normal speed, a search mode for reproducing data at a standard variable reproduction speed v, and a very high speed reproduction mode for reproducing data at a standard very high speed reproduction speed K. For simplicity of description, a case where the standard variable reproduction speed v=N+0.5=3.5 times the normal speed (N=3) and the standard very high speed reproduction speed K=56 times the normal speed will be explained as an example.

Figure 16:
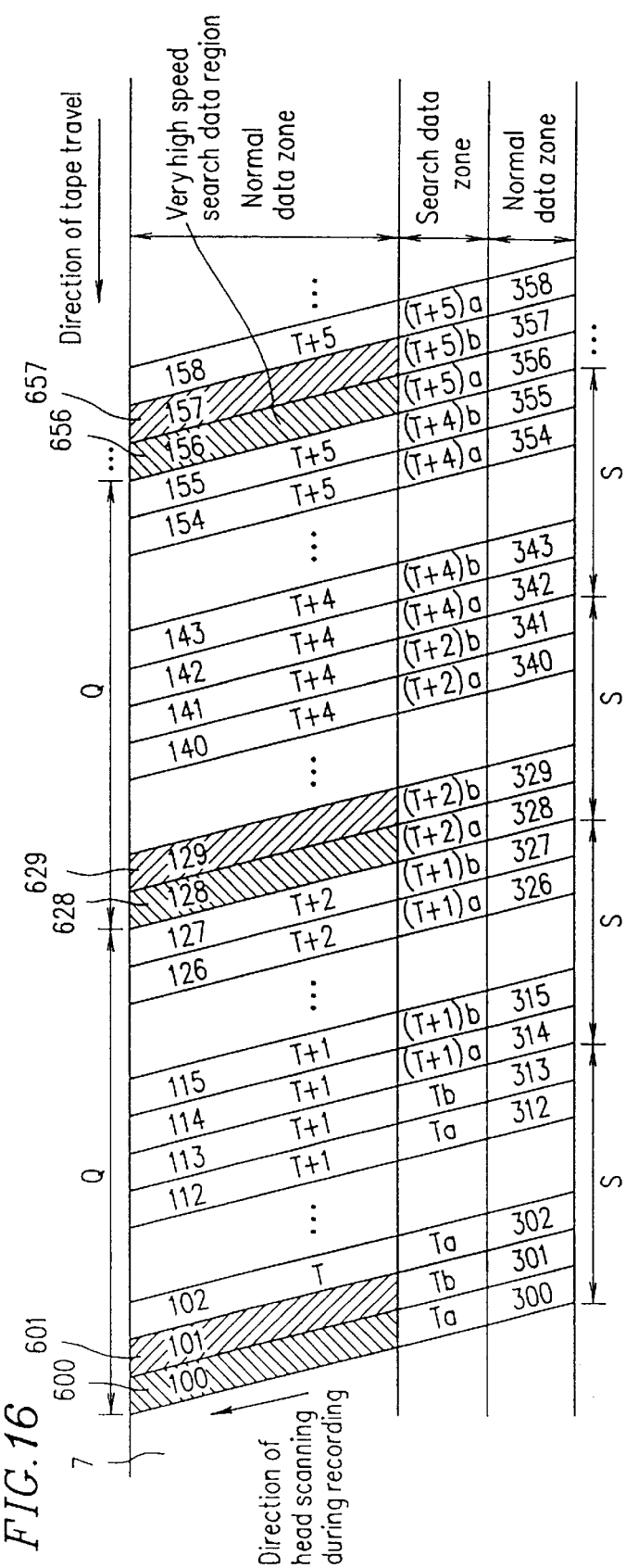
FIG. 16 is a diagram showing the track pattern in Example 6 of the present invention.

FIG. 16 schematically shows the track pattern formed by the data recording/reproducing apparatus of Example 6. As shown in FIG. 16, a search data zone is formed on the magnetic tape 7 in the shape of a strip along the direction of tape travel of the magnetic tape 7. Herein, the placement of search data regions in the search data zone is similar to that described in Example 1, so that the detailed descriptions thereof will be omitted.

The placement of search data regions in Example 6 is almost similar to that described in Example 5, except for the standard very high speed reproduction speed K=56 times the normal reproduction speed. Accordingly, the very high speed search data regions are placed at intervals of Q=K/2=28 tracks in the normal data zone. The two adjacent tracks having different azimuth angles (a pair track) are selected at intervals of Q tracks. The very high speed search data is recorded by using the portions (e.g., 600 and 601) in the normal data regions (e.g., 100 and 101) of this pair track. The portions have a length equal to or more than a half of the track length. The data to be recorded in the very high speed search data region of one track of the pair track is different from that of the other track.

Figure 17:
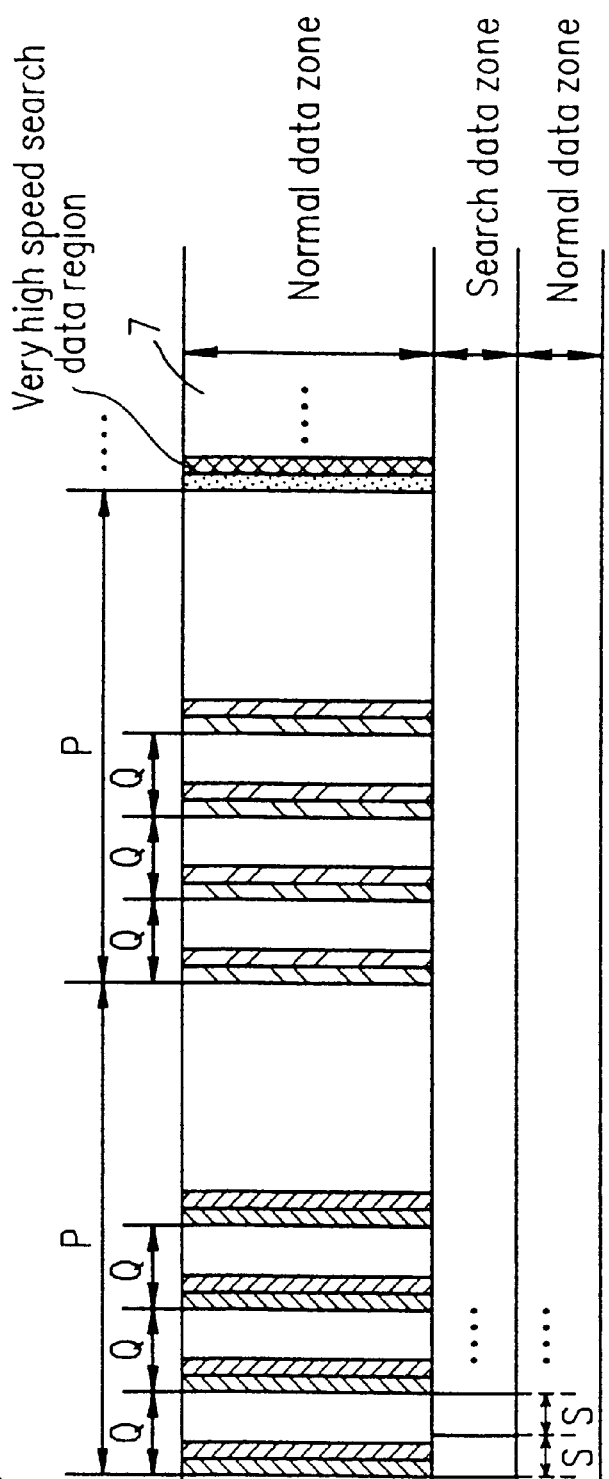
FIG. 17 is a schematic diagram showing the track pattern in Example 6 of the present invention.

The track cycle P (P≧4Q) is 200 tracks. The very high speed search data regions are provided in J=4 tracks among the tracks having the same azimuth angle within the track cycle P, and the same very high speed search data is recorded in each of the very high speed search data regions of the 4 tracks. That is, four pair tracks having the same very high speed search data are located within the track cycle P at intervals of Q tracks. This track cycle P is the update cycle of the very high speed search data on the magnetic tape 7. FIG. 17 shows the track pattern shown in FIG. 16 in a more macroscopic view. Within one cycle of P=200 tracks, the very high speed search data regions of four tracks (J=4) of the R azimuth angle and having the same data are located at intervals of Q=28 tracks, while the very high speed search data regions of four tracks (J=4) of the L azimuth angle and having the same data are located at intervals of Q=28 tracks.

Herein, in a case where image data of one frame is divided into M'=50 parts and the divided data is placed in the very high speed search data region as block data, a picture of one frame can be formed from M'×P/2=5000 tracks. According to such an arrangement as discussed above, though the cycle of update of the picture becomes longer, the amount of data placed in the very high speed search data region can be reduced. Hence, this arrangement is advantageous especially for very high speed reproduction in which a long cycle of update of the picture is not so problematic.

As described hereinbefore, by providing the very high speed search data region other than the search data region, variable-speed reproduction having an appropriate cycle of update of the picture and realizing a high picture quality can be performed both in the search at a relatively low speed and the search at a relatively high speed.

In Example 6, one search data region is provided for each track. Provision of a plurality of search data regions can realize the variable-speed reproduction in a wider range, further improvement of picture quality, and reduction of the error ratio in the data and the like.

In Example 6, the starting point of one cycle of update of the data, the cycle being composed of P tracks, is common to the search data regions of R-tracks, the search data regions of L-tracks, and the very high speed search data region. However, it may be different in each kind of search data region.

EXAMPLE 7

Figure 18:
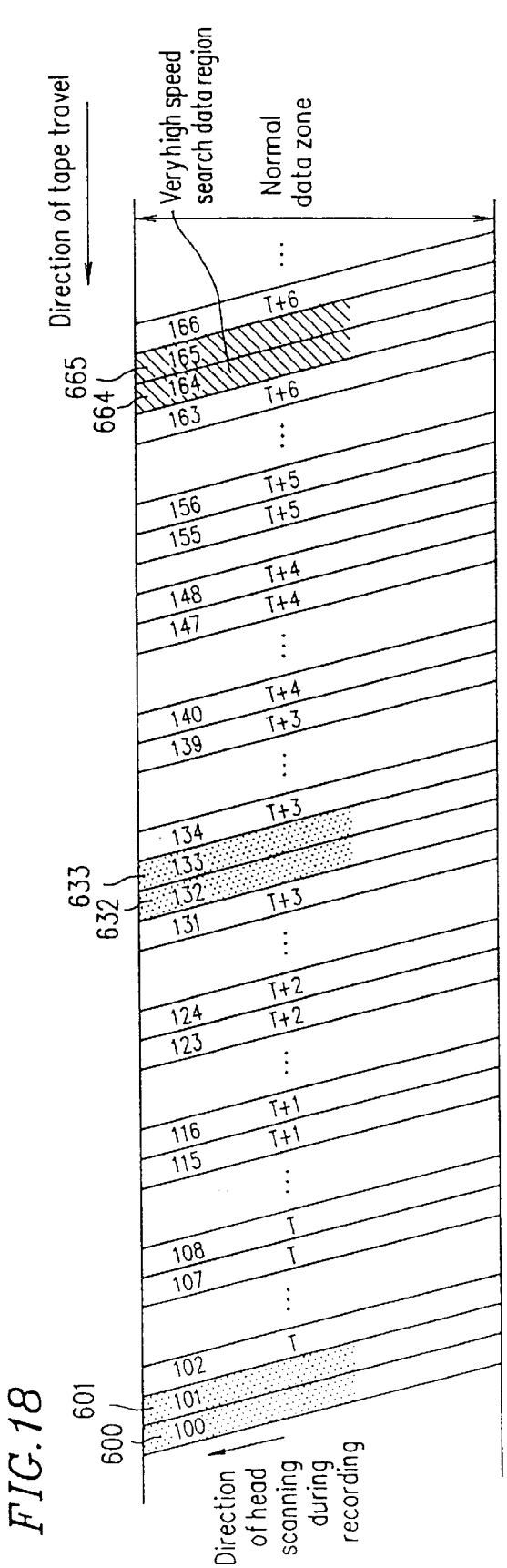
FIG. 18 is a diagram showing the track pattern in Example 7 of the present invention.

A data recording/reproducing apparatus of Example 7 of the present invention will be described with reference to accompanying drawings. A case where the standard very high speed reproduction speed K=64 times the normal reproduction speed will be described as an example. FIG. 18 schematically shows the track pattern formed by the data recording/reproducing apparatus of Example 7.

In Example 7, the very high speed search data region is provided in the normal data region of each of two adjacent tracks having different azimuth angles (a pair track). The very high speed search data regions are formed in units of pair tracks. The same data is recorded in each of two very high speed search data regions (e.g., 600 and 601) of each pair track. The very high speed search data region has a length equal to or more than a half of the track length, and is located at intervals of Q=K/2=32 tracks.

The track cycle P is 2Q=64 tracks. Within the track cycle P, J'=2 pair tracks are provided. Identical data is recorded in each of the very high speed search data regions (e.g., 600, 601, 632 and 633) of these two pair tracks. Herein, J' stands for the number of very high speed search data regions having the same data and formed within the track cycle P in units of pair tracks, and J'=J/2 (J=the number of very high speed search data regions having the same data).

The placement of data in each of the very high speed search data regions is the same as that described in Example 5. The very high speed search data regions 600 and 601 are located in the normal data regions 100 and 101, respectively. Block data generated by highly compressing image data T of one frame at a time t and dividing into a plurality of minute blocks is recorded in the very high speed search data regions 600. The length of the block data is such that the data can be reliably read by scanning at a speed 64 times the normal reproduction speed. The very high speed search data regions 600 and 601 are padded with first block data D1. Similarly, very high speed search data regions 632 and 633 are located in the normal data regions 132 and 133 at the intervals of Q tracks, respectively, and the block data D1 is recorded therein. Next, very high speed search data regions 664 and 665 are padded with second block data D2. This procedure is sequentially repeated.

The normal reproduction data is placed in the portion of the normal data region other than the very high speed search data region. The image data of one frame for normal reproduction is not necessarily recorded by using ten tracks. For example, in a case that the image data includes both intra-frame compressed data and inter-frame compressed data, the number of tracks for recording the image data of one frame can be changed.

Figure 19:
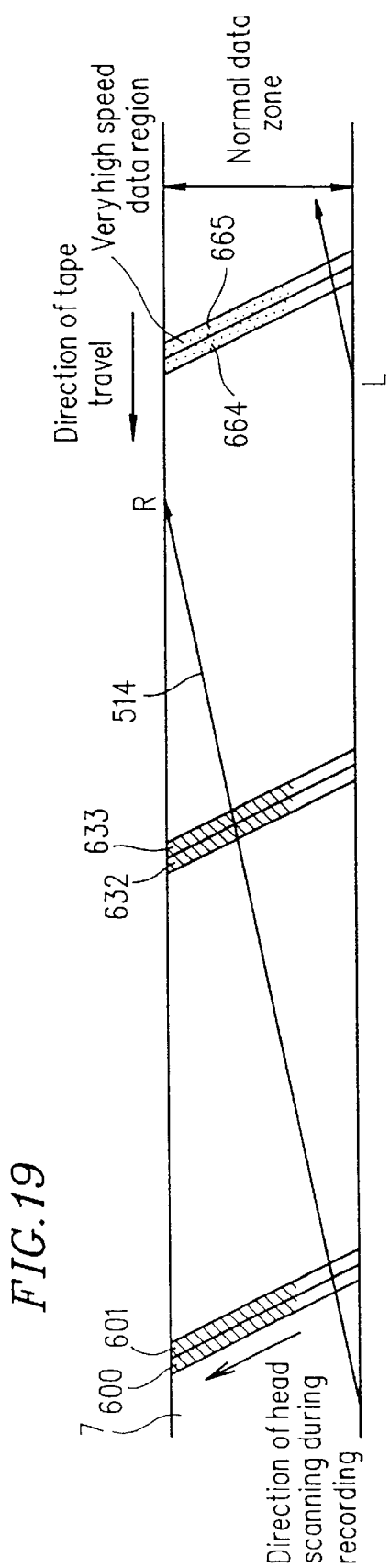
FIG. 19 is a schematic diagram showing the track pattern in Example 7 of the present invention.

Next, the operations in the very high speed data reproduction will be described. FIG. 19 schematically shows the track pattern formed by the data recording/reproducing apparatus of Example 7.

The scanning performed by the magnetic head 6 (the head 6a) is shown by a path 514. As shown in FIG. 19, either one of the heads 6a and 6b certainly scans the very high speed search data region once with respect to K=64 tracks in the reproduction at a speed 64 times the normal reproduction speed. Accordingly, the data can be reproduced from the very high speed search data regions recorded at intervals of Q=32 tracks.

This procedure of scanning is sequentially performed, whereby all the data recorded in the very high speed search data regions corresponding to the image data of one frame can be effectively reproduced. Thus, the variable-speed reproduction is performed with a high picture quality.

The detailed description of the block data reproduced when the magnetic head 6 crosses the track in the very high speed reproduction is similar to that described in Example 5 with reference to FIG. 15.

Hence, similar to Example 5, at the variable-speed reproduction speed K=64 times the normal reproduction speed, all the data can be reproduced from the very high speed search data region, without the phase control of the capstan motor 22. Herein, when the image data of one frame is divided into M'=50 parts and the divided data is placed in the very high speed search data region as block data, a picture of one frame can be formed from M'×2Q=3200 tracks.

As described hereinbefore, the very high speed search data region is provided in an area of the pair track located with the cycle of Q=K/2 tracks, the area having a length equal to or more than a half of the track length, whereby all the effective data in the very high speed search data region can be reproduced at the variable reproduction speed K=64 times the normal reproduction speed, without depending on the number or arrangement of the heads.

In Example 7, with respect to the standard reproduction speed K=64 times, J'=2 pair tracks having the very high speed search data regions are formed at the intervals of Q=K/2=32 tracks. When the cycle of update of image data can be made longer, the number J' of the pair tracks having the very high speed search data regions carrying the same data, which are formed at the intervals of Q=K/2=32 tracks, can be made more than 2. Furthermore, if the number J' of the pair tracks having the very high speed search data regions carrying the same data is set at J'>3, one of the intervals between these pair tracks may be Q tracks, with the remaining intervals being other than Q tracks. As a result, the number of reproduction speeds available for variable-speed reproduction can be increased.

When the track cycle P is longer, the area in the tracks used for the very high speed search data regions can be made smaller. As a result, it becomes possible to reduce the amount of decrease of the area to be used for the normal data region within the normal data zone.

In a case where J'=2 pair tracks having the very high speed search data regions are located at intervals of Q tracks, if each of the very high speed search data regions has a length more than a half of the track length, as described hereinafter, all the data of the very high speed search data region can be effectively obtained at a reproduction speed higher than the standard speed reproduction speed K.

Where the track length is 1, and the length of the very high speed search data region is X (1>X≦½), the range of reproduction speeds V allowing all the effective data to be reproduced without the phase control of the capstan motor 22 is:

In positive direction variable-speed reproduction:

$$Q/(X+Y)+1 \leq V \leq Q/(1-X+Y)+1$$

In negative direction variable-speed reproduction:

$$-Q/(X+Y)+1 \leq V \leq -Q/(1-X+Y)+1$$

where, Y=0, 1, 2 , . . . . With respect to all the speeds V obtained for each Y, in the range of speeds as expressed by the above formulae, all the data in the very high speed search data region can be effectively reproduced.

Similarly, in a case where the number J' of the pair tracks having the very high speed search data regions carrying the same data is J'>3, the range of reproduction speeds $V_i$ is:

In positive direction variable-speed reproduction:

$$Q_i/(X+Y)+1 \leq V_i \leq Q_i/(1-X+Y)+1$$

In negative direction variable-speed reproduction:

$$-Q_i/(X+Y)+1 \leq V_i \leq -Q_i/(1-X+Y)+1$$

where, Y=0, 1, 2, . . . . The track interval $Q_i$ is the interval between each of the pair track J' having the very high speed search data regions. With respect to each reproduction speed $V_i$, within the range expressed by the above formulae, all the data recorded in the very high speed search data region can be effectively reproduced without the phase control of the capstan motor 22. For example, when J'=3, the track interval $Q_i$ is of three kinds $Q_1$, $Q_2$ and $Q_3$. In each of the respective reproduction speed ranges of $V_1$, $V_2$ and $V_3$, for the three track intervals, all the data in the very high speed search data regions can be effectively reproduced.

In Example 7, the very high speed search data region is provided for each track of the pair track having an azimuth angle different from each other. Alternatively, the very high speed search data region may be provided only in the track of either one of azimuth angles when performing the phase control of the capstan motor 22.

Also, similar to Example 5, image data of one frame can be divided in an arbitrary manner. The dividing direction of the image data may be the vertical direction or the horizontal direction, and the blocks may have arbitrary shapes and sizes. The picture dividing number M' may be arbitrarily determined, and the picture dividing number may be different in each frame. The number of data groups constituting the block data can be arbitrarily determined, for example, so as to be different in each very high speed search data region using the pair track.

EXAMPLE 8

A data recording/reproducing apparatus of Example 8 of the present invention will be described with reference to accompanying drawings. With respect to the search data region, Example 8 is similar to Example 1, where the standard variable reproduction speed v=N+0.5=3.5 times (N=3) the normal reproduction speed, and the detailed description thereof will be omitted here.

Figure 20:
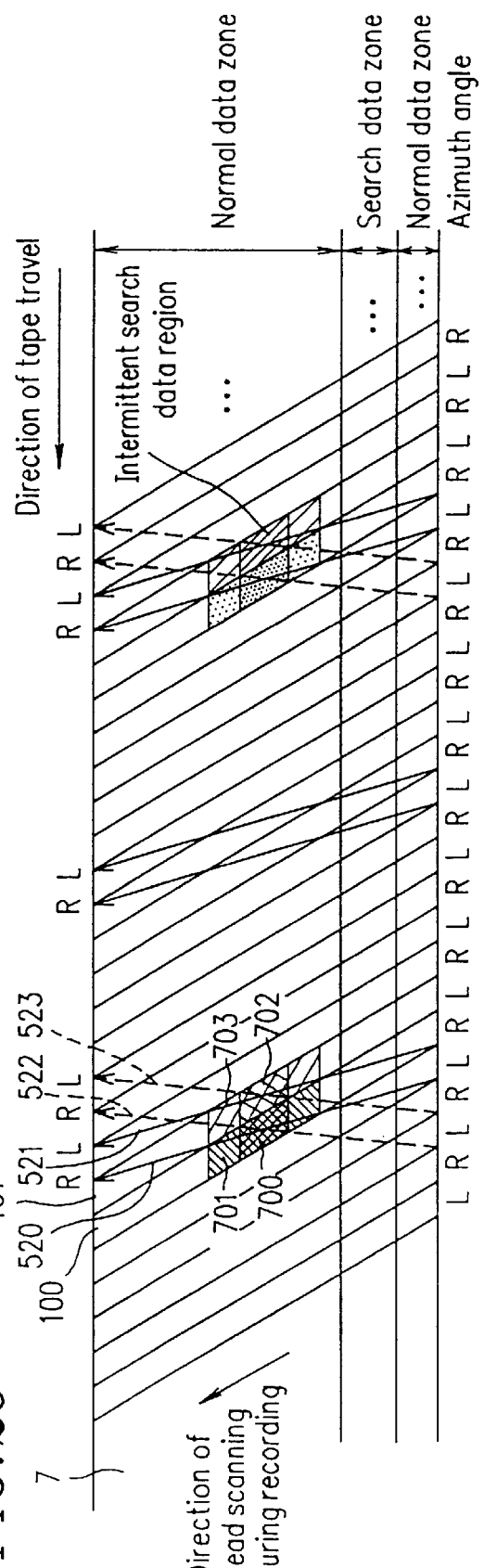
FIG. 20 is a diagram showing the track pattern in Example 8 of the present invention.

FIG. 20 shows the track pattern formed by the data recording/reproducing apparatus of Example 8. In Example 8, a case where the magnetic head 6 is a combination head composed of two adjacent heads 6a and 6b having an azimuth angle different from each other which is mounted on the cylinder 20 will be described. In FIG. 20, paths 520 and 521 indicated with solid lines show the scannings of the heads 6a and 6b, respectively, in the variable-speed reproduction at a speed four times the normal reproduction speed. Paths 522 and 523 indicated with broken lines show the scannings of the heads 6a and 6b, respectively, in the variable-speed reproduction at a speed eight times the normal reproduction speed.

A first intermittent search data region 700 is located in an area of a normal data region 100 which is scanned by the head 6a in the variable-speed reproduction commonly at speeds four times (the path 520) and eight times (the path 522) the normal reproduction speed. A second intermittent search data region 701 is located in an area of the normal data region 100 which is scanned by the head 6a only in the variable-speed reproduction at a speed four times (the path 520) the normal reproduction speed. Similarly, a first intermittent search data region 702 is located in an area of a normal data region 101 which is scanned by the head 6b in the variable-speed reproduction at speeds four times (the path 521) and eight times (the path 523) the normal reproduction speed. A second intermittent search data region 703 is located in an area of the normal data region 101 which is scanned by the head 6b only in the variable-speed reproduction at a speed four times (the path 521) the normal reproduction speed. In Example 8, the phase control of the capstan motor is performed in the reproduction at speeds four times and eight times the normal reproduction speed.

Primary data is placed in the first intermittent search data region 700, while secondary data is placed in the second intermittent search data region 701. The first and second intermittent search data regions 700 and 701 are together referred to as an intermittent search data region. For example, DC components of the compressed image data obtained by discrete cosine transform may be recorded in the first intermittent search data region 700, while the low band components of AC components of the compressed data may be recorded in the second intermittent search data region 701. The first and second intermittent search data regions 702 and 703 are similarly subject to the data recording.

By thus placing intermittent search data, the data is obtained from both of the first and second intermittent search data regions 700 and 701 in the reproduction at a speed four times the normal one, while the data is obtained from the first intermittent search data region 700 in the reproduction at a speed eight times the normal one. Accordingly, a large amount of data can be obtained in the reproduction at a relatively low speed, where the picture quality may be important. As a result, in comparison with the reproduction at a high speed, the picture quality of a reproduced picture is enhanced.

Also, the range of the variable-speed reproduction is widened since the data in the search data region is also obtainable in the reproduction at a speed 3.5 times the normal reproduction speed. Furthermore, a picture of higher picture quality can be obtained in the reproduction at a relatively low speed, since the data can be reproduced from the search data region and the first and second intermittent search data regions 700 and 701. Also, the redundancy of the search data may be increased by recording the same data (e.g., DC components of the compressed image data obtained by discrete cosine transform) in the search data region and in the first intermittent search data region 700. In order to reduce the error ratio in the data in the reproduction at a relatively low speed, in which both of the data recorded in the search data region and in the first intermittent search data region 700 can be reproduced.

Though being exemplified by a speed which is an even number times the normal reproduction speed in Example 8, the variable reproduction speed is not limited to this even number times the normal reproduction speed. The location of the first and second intermittent search data regions 700 and 701 is not limited to the areas shown in FIG. 20. The intermittent search data region can be located anywhere on the magnetic tape 7, as far as being located on the area always scanned by both of the heads 6a and 6b in the reproduction at a plurality of reproduction speeds.

Furthermore, the range of the variable-speed reproduction can be widened using a small amount of data, and the picture quality of the reproduced picture can be further enhanced by compressing image data using discrete cosine transform; recording the DC components of the compressed data in the search data region; recording the low band components of AC components of the compressed data in the first intermittent search data region 700; and recording the high band components of AC components of the compressed data in the second intermittent search data region 701.

The path scanned by the magnetic head 6 may change depending on the number and/or the arrangement of the heads provided on the magnetic head 6. In such a case, in accordance with the location of the heads, the first and second intermittent search data regions may be located in the area which is commonly scanned by the magnetic head 6 in the reproductions at a plurality of reproduction speeds. For example, in the case of the combination head, the location of the intermittent search data region of the R azimuth angle and that of the L azimuth angle in the direction of tracks is corrected in accordance with the distance (stagger) between the heads 6a and 6b.

The intermittent search data region available for two kinds of variable reproduction speeds has been described in Example 8. Alternatively, the present invention can be easily applied to the system having three or more kinds of variable reproduction speeds. For example, a region scanned by the magnetic head 6 at one kind of reproduction speed, a region commonly scanned thereby at two kinds of reproduction speed, a region commonly scanned at three kinds of reproduction speed etc., may be respectively provided. Similarly, the present invention is applicable to the system having further more kinds of variable reproduction speeds.

In order to reproduce the data from the intermittent search data region, the phase control of the capstan motor 22 is required. However, by using the data in the search data region in a transition state of the head in which the head is guided to the proper path on the intermittent search data region by the phase control, the image can also be reproduced.

EXAMPLE 9

Figure 21:
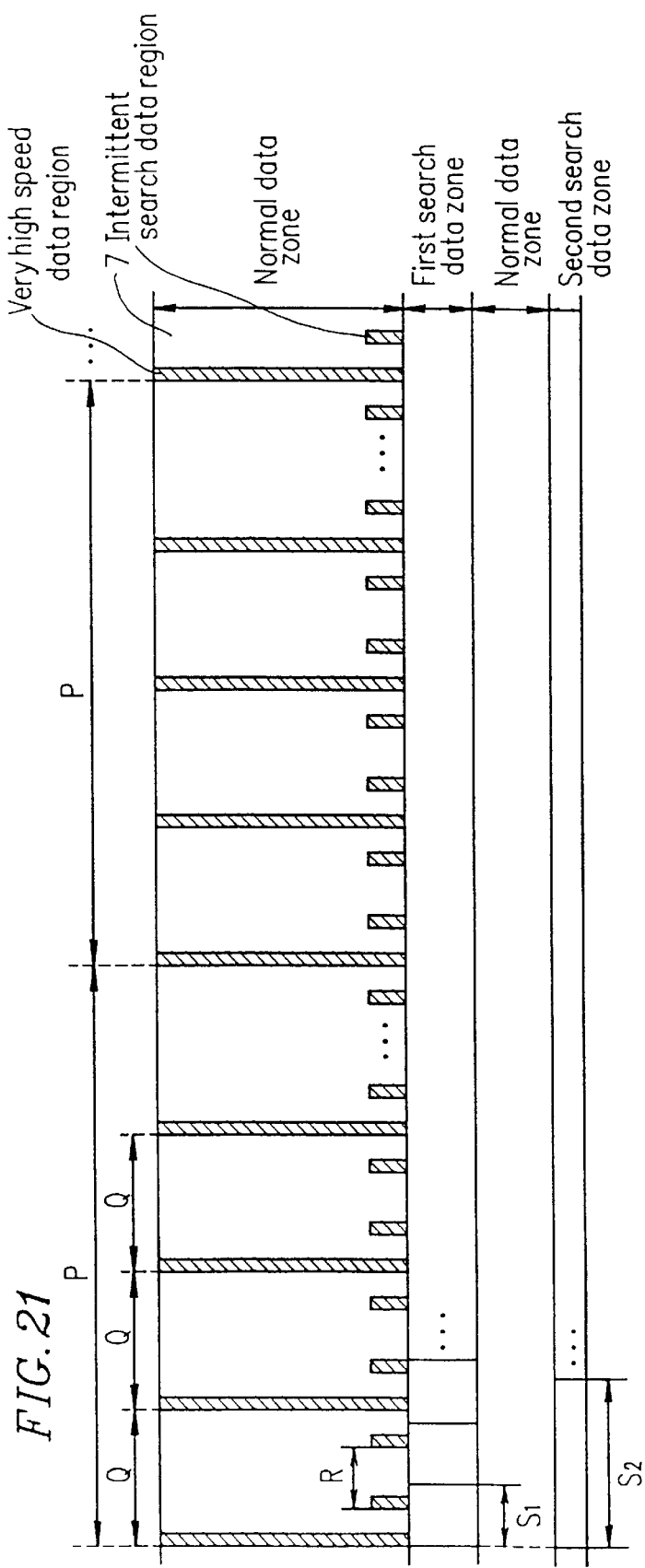
FIG. 21 is a schematic diagram showing the track pattern in Example 9 of the present invention.

A data recording/reproducing apparatus of Example 9 of the present invention will be described with reference to accompanying drawings. FIG. 21 schematically shows the track pattern formed by the data recording/reproducing apparatus of Example 9. In FIG. 21, each of the shadowed portions indicates a pair track. The data recorded in the very high speed search data region of one of two tracks having different azimuth angles constituting the pair track is different from the data recorded in that of the other of two tracks.

In a method similar to that described in Example 1, the search data regions corresponding to the first standard variable reproduction speed $v_1=N_1+0.5=3.5$ times the normal reproduction speed are located in the first search data zone, and the search data regions corresponding to the second standard variable reproduction speed $v_2=N_2+0.5=9.5$ times the normal reproduction speed are located in the second search data zone, as shown in FIG. 21.

In the first search data zone, identical data is recorded in the search data regions of the track set of $(2N_1+1)=7$ tracks having the same azimuth angle. In the second search data zone, other identical data is recorded in the search data regions of the track set of $(2N_2+1)=19$ tracks having the same azimuth angle. In the tracks of both of azimuth angles, the data of the first search data zone is updated by $2\times(2N_1+1)=14$ tracks, while the data of the second search data zone is updated by $2\times(2N_2+1)=38$ tracks. In a case where the picture dividing number $M_1$ of the image data placed in the first search data zone is 2 and the picture dividing number $M_2$ of the image data placed in the second search data zone is 4, the number of tracks necessary for forming image data of one frame is $S_1=M_1\times(2N_1+1)=14$ in the first search data zone, and $S_2=M_2\times(2N_2+1)=76$ in the second search data zone. These are the cycles for the update of image data on the tracks in respective search zones.

By using such an arrangement mentioned above, all the data can be effectively reproduced from the first and second search data regions at respective standard variable reproduction speeds without the phase control of the capstan motor 22, which allows reproduction of a picture with high picture quality.

The very high speed search data regions are formed in the manner similar to that of Example 6. That is, the very high speed search data region is located in each of two adjacent tracks (the pair track) having an azimuth angle different from each other, so as to have a length equal to or more than a half of the track length. Data recorded in the very high speed search data regions of two tracks of the pair track are different from each other. The track cycle P is set to be 200 tracks. The very high speed search data regions are provided in four tracks (J=4) among the tracks having the same azimuth angle within one track cycle P, and the same data is recorded in each of the very high speed search data regions of the four tracks. Namely, four pair tracks having the identical very high speed search data are located within the track cycle P at intervals of Q=K/2=32 tracks. The track cycle P is the cycle for the update of very high speed search data on the magnetic tape 7.

In a case where the dividing number M' of the image data of one frame is 50, the cycle of update of image data on the magnetic tape 7 is M'×P/2=5000 tracks. Herein, the standard very high reproduction speed K=2Q=64 times the normal reproduction speed. However, when the very high speed search data region has a length more than half of the track length, the range of the very high reproduction speeds allowing all the data to be effectively reproduced can be widened (see Example 5).

Thus, by making the track cycle P longer and locating the J very high speed search data regions at intervals of Q tracks, the area used for the very high speed search data regions on the tracks can be reduced, which allows the normal data region to be larger. Also, by such a placement of the data mentioned above, all the data within the very high speed search data region can be effectively obtained without the phase control of the capstan motor 22. This allows reproduction of a picture of high picture quality.

Similar to Example 8, primary data may be placed in the first intermittent search data region which is commonly scanned by the magnetic head 6 in the variable-speed reproduction at a plurality of speeds (e.g., four times and eight times the normal reproduction speed), while secondary data is placed in the second intermittent search data region scanned by the magnetic head 6 in the variable-speed reproduction of at least one kind of reproduction speed (e.g., four times the normal reproduction speed).

The intermittent search data region composed of the first and second intermittent search data regions is provided in the pair track located at intervals of W=16 tracks. Data recorded in the intermittent search data region is different between the two tracks of the pair track. By thus placing the data, though the phase control of the capstan motor 22 is required, a reproduced picture with high picture quality can be obtained in the variable-speed reproduction at a relatively low speed where the picture quality is important.

For example, the DC components of the compressed image data obtained by discrete cosine transform are recorded in the first search data region, the low band components of AC components of the compressed image data are recorded in the second search data region, the higher order bits of the DC components of the compressed image data are recorded in the very high speed search data region, and the high band components of AC components of the compressed data are recorded in the second intermittent search data region. By employing the above-mentioned data placement, a picture of appropriate picture quality in accordance with the variable reproduction speed and having a proper cycle of update of image can be obtained, as well as by increasing the redundancy of the data, the error ratio in the data can be reduced.

As described above, forming the first search data region; the second search data region; the very high speed search data region; and the intermittent search data region widens the range of the variable reproduction speed and realizes the variable-speed reproduction with appropriate picture quality and a proper update cycle in accordance with the variable reproduction speed.

In the above-mentioned examples, the image data to be recorded in the search data region, the very high speed search data region, and the intermittent search data region is the image data of the latest frame when the data for the respective regions is recorded. However, the image data to be recorded can be arbitrarily selected from the image data of precedent frames.

The data for the search data region, the very high speed search data region, and the intermittent search data region is not limited to image data. Audio data, additional information such as a time code and the like may be recorded in such regions. Furthermore, although the data to be placed in these regions has been described as being different in each region, identical data may be placed therein, whereby the redundancy of the data increases and the error ratio decreases.

The variable-speed reproduction in a negative direction can be similarly realized as well as the above described positive direction reproductions.

EXAMPLE 10

Figure 22:
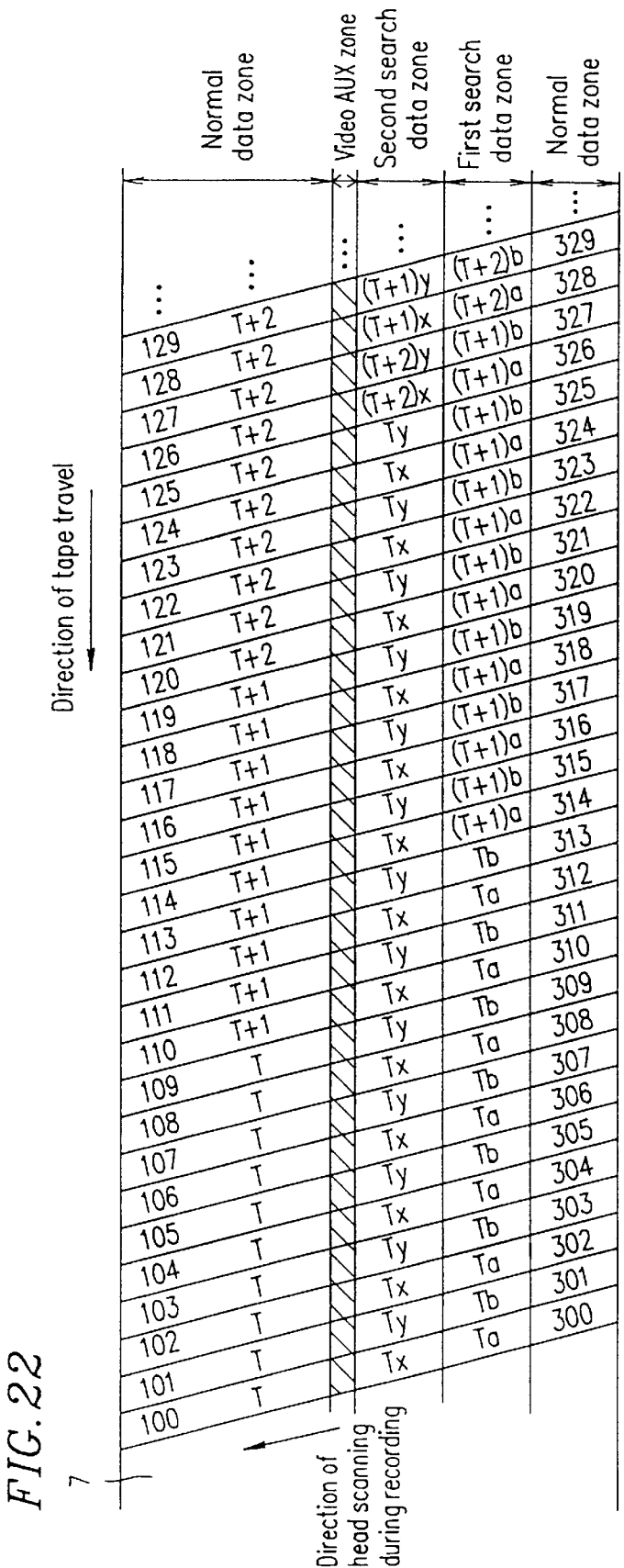
FIG. 22 is a diagram showing the track pattern in Example 10 of the present invention.

A data recording/reproducing apparatus of Example 10 of the present invention will be described with reference to accompanying drawings. FIG. 22 schematically shows the track pattern formed by the data recording/reproducing apparatus of Example 10. In FIG. 22, since the normal data region, the first and second search data regions are similar to those of Example 4, the detailed description thereof will be omitted. It is assumed that the first standard variable reproduction speed $v_1$ of the first search data region $v_1=3.5$ times the normal reproduction speed, while the second standard variable reproduction speed $v_2$ of the second search data region $v_2=6.5$ times the normal reproduction speed.

As is shown in FIG. 22, in Example 10, video AUX regions are provided by the formatter 3 on the magnetic tape 7 along the direction of tape travel. When recording data, information of the first standard variable reproduction speed $v_1$ for the first search data region and the second standard variable reproduction speed $v_2$ for the second search data region is repeatedly recorded in the video AUX regions of all the tracks on the magnetic tape 7. The video AUX region is an additional region which is reserved in the video data recorded on the magnetic tape 7, in units of sync blocks.

The information of the first standard variable reproduction speed $v_1$ and the second standard variable reproduction speed $v_2$, which is repeatedly recorded in the video AUX region, is read by the magnetic head 6 and stored, when the magnetic tape 7 is inserted in the data recording/reproducing apparatus for reproducing the data. In the variable-speed reproduction, the variable reproduction speed is determined based on the standard variable reproduction speed, whereby the capstan motor 22 is controlled.

In this way, by repeatedly recording the information of the standard variable reproduction speeds on the magnetic tape 7, the standard variable reproduction speed of the search data region can be quickly obtained at an arbitrary position on the magnetic tape 7. As a result, it becomes possible to promptly carry out the variable-speed reproduction. Furthermore, in a case where a plurality of software of which standard variable reproduction speeds are different from one another are recorded on the magnetic tape 7, the reproduction thereof is smoothly carried out by checking the video AUX regions. In addition, since the information of the standard variable reproduction speed is recorded in the video AUX region provided within the region of the video data region, there is no apprehension that the information is overwritten by audio data inserting or the like.

The time when the information of the standard variable reproduction speed is read from the video AUX region is not limited to the insertion of the magnetic tape. The information can be read during the reproduction, fast forwarding, displaying a still picture, rewinding or the like.

The data repeatedly recorded on the magnetic tape 7 is not limited to the information of the standard variable reproduction speed. For example, the numbers N (described in Example 1), N' (described in Example 3), and K (described in Example 5) may be recorded in the data region for variable-speed reproduction, if any, as the variable reproduction speed corresponding to this region. Also, the maximum reproduction speed can be recorded in order to improve the variable reproduction speed by using the phase control or the like. The flag indicating these data can also be recorded.

Likewise, the position of the search data region on the track, for example, the block numbers of the starting sync block and the ending sync block of the first and second search data regions can be repeatedly recorded in the video AUX region. At this time, the deformatter 11 can easily extract the search data by using this sync block number. In such a case, in comparison with the case where the search data is extracted from all the reproduced data by using the flag, the configuration of the formatter 11 can be simplified. Also, in comparison with the case where the position of the search data is defined by the predetermined format, the degrees of freedom of locating the search data regions can be increased.

By recording such information in the video AUX region, the position of the search data region can be easily changed in units in which a specific region (e.g., audio signal region) is excluded. In addition, a plurality of software of which position in the search data region is different from one another can be recorded on one magnetic tape 7. Herein, the sync block number is recorded as information indicating the start and end of the search data region. Alternatively, arbitrary data may be used as far as the data indicates the position of the search data region. For example, the starting sync block number and the length of the search data region (i.e., the number of sync blocks included in the search data region) are usable. In a case of forming the search data region only in the specific tracks, the information representing this specific track (e.g., data representing the tracks of the R azimuth angle or the track number) may be used.

As described in the foregoing, by repeatedly recording the standard variable reproduction speed of the search data region in the direction of tape travel of the magnetic tape, the standard variable reproduction speed can be quickly detected at an arbitrary position on the tape. Thus, there is no need for defining the standard variable reproduction speed by format or the like in advance. In addition, by repeatedly recording the information of the position of the search data region along the direction of tape travel of the magnetic tape, the position of the search data region can be quickly judged at an arbitrary position on the tape. As a result, the signal processing can be simplified, and the location of the search data region in units of track sets or search data regions can be easily modified.

In Example 10, the information of the standard variable reproduction speed and that of the positions of the search data regions are recorded in the video AUX region. However, they may be recorded in an arbitrary area as far as they are repeatedly recorded on the magnetic tape 7. For example, they may be recorded in a sub-code region, an existing header, a newly produced header and the like. Herein, "header" means a data region which is recorded on the magnetic tape 7 being added to before or after the recording data (video data, audio data and the like). The "existing header" means an ID information region within the sync block. The "newly produced header" is, for example, a new header added after the synchronization information or ID information within the sync block. The data repeatedly recorded on the magnetic tape 7 is not limited to the information of the standard variable reproduction speed, the positional information and the like. The information for use in the reproduction of data, for example, the number of tracks recording the same search data, the information indicating the kinds of the data recorded in the data region for variable-speed reproduction (e.g., the flag indicating that the very high speed search data regions are formed, the flag indicating that the intermittent search data regions are formed, and the flag indicating the kind of the search data region) can also be recorded.

In Example 10, the information of the standard variable reproduction speed and that of the position of the search data region are recorded in the video AUX region of all the tracks. However, such information to be used in the variable-speed reproduction may be recorded at intervals of several tracks. Also, in a case where some of such information is previously defined by the format or the like, the remaining data may be recorded.

EXAMPLE 11

Figure 23:
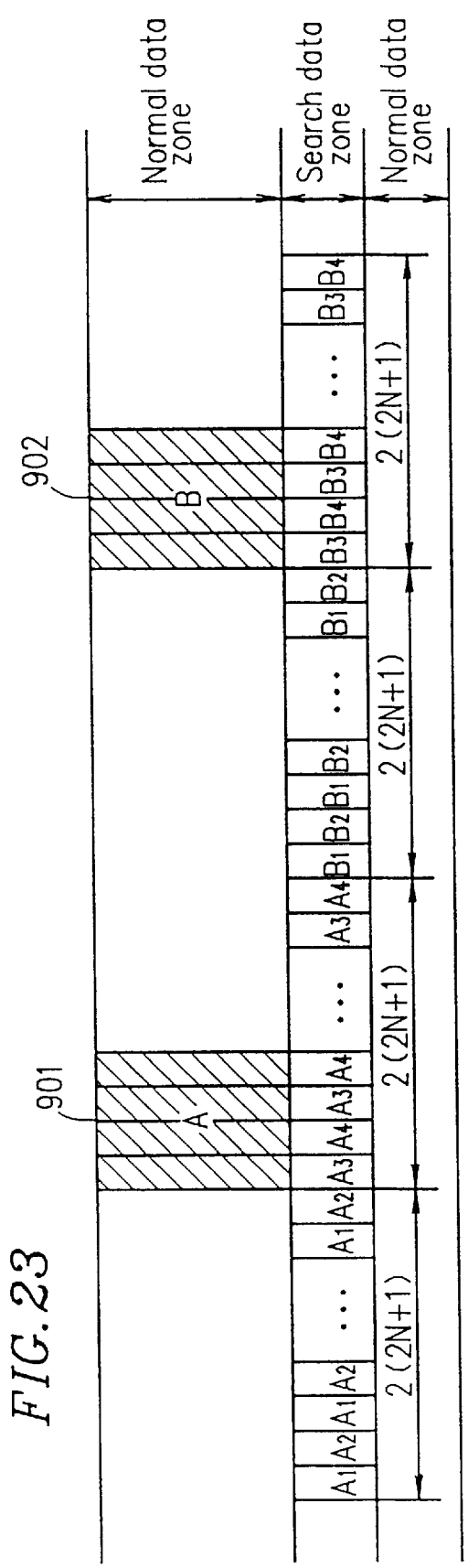
FIG. 23 is a schematic diagram showing the track pattern in Example 11 of the present invention.

A data recording/reproducing apparatus of Example 11 of the present invention will be described with reference to accompanying drawings. FIG. 23 schematically shows the track pattern formed by the data recording/reproducing apparatus of Example 11. The configuration of the data recording/reproducing apparatus is the same as that described in Example 1.

As is shown in FIG. 23, in the normal data zone, one-frame image data is recorded in four tracks as normal reproduction data A. The normal reproduction data A is generated, for example, by intra-frame compressing one-frame image data T at a time t by the normal reproduction encoder 1. At the same time, the one-frame image data T at a time t is compressed by the searching encoder 2 and is further divided into four parts so as to generate search data A1, A2, A3 and A4 (the picture dividing number M=4).

First, each of the search data A1, A2, A3 and A4 is repeatedly recorded in a track set of (2N+1) tracks selected by every other track. More specifically, as shown in FIG. 23, the search data A1 and A2 are recorded in the successive 2×(2N+1) tracks, followed by the search data A3 and A4 recorded in the successive 2×(2N+1) tracks. Accordingly, in the search data zone, the search data corresponding to the image data T at a time t are recorded by using 4×(2N+1) tracks in total.

At this time, the normal reproduction data A is placed in the normal data regions 901 located in the substantial center of the 4×(2N+1) tracks in which the search data is recorded. The placement of normal reproduction data A in the shifted position is realized by delaying the recording time using a memory.

In the variable-speed reproduction, similar to Example 1, all the data recorded in the search data regions can be effectively reproduced by two complementary scannings of the heads 6a and 6b or by either one of the two scannings. In a case where the search data is reproduced in the order of A1, A2, . . . , a display picture is updated when all the data (A1, A2, A3 and A4) necessary for forming one picture (i.e., one frame) are obtained. The same operation can be applied to a case where variable-speed reproduction is performed in the opposite direction.

Hence, in the search in the normal direction, the position at which a reproduced picture is updated and replaced with the picture corresponding to the search data of the normal reproduction data A (the image data T at a time t), (i.e., the position at which all of A1, A2, A3 and A4 are reproduced) is shifted by 2×(2N+1) tracks from the starting point of the normal data region 901 in which the normal reproduction data A is recorded. When a desired picture is obtained in search in the normal direction, the head has to return by 2×(2N+1) tracks in order to start the normal reproduction from the corresponding normal picture data (A). Likewise, also in the search in the opposite direction, the head has to return by 2×(2N+1) tracks in order to start the normal reproduction from the picture obtained by the search.

In a case where the normal reproduction data A is recorded from the same track as the track where the recording of the search data A1, A2, A3 and A4 is started, the excess track amount of searching in the normal direction is 4×(2N+1) tracks. Thus, in Example 11, the amount of excessive search in the normal direction can be reduced to half.

As described hereinbefore, using the tracks having the normal data region, where the one-frame image data for normal reproduction is placed as an approximate center (i.e., a substantial center), the search data of the one-frame image data for normal reproduction is placed in the search data region in a plurality of track sets including the tracks and the preceding and succeeding tracks, whereby the amount of excessive search can be reduced.

In Example 11, the track from which recording of the image data A for normal reproduction is started is located at the center of 4×(2N+1) tracks. Alternatively, four tracks for recording the image data A for normal reproduction may be located at the center portion of 4×(2N+1) tracks.

Also, in a case where the search in the normal direction is used more often than the search in the opposite direction, the image data A for normal reproduction can be placed in the tracks following the tracks in which the search data A1, A2, A3 and A4 are recorded. In such a case, the amount of excessive search can be further reduced.

In Example 11, the normal data regions are located at the approximate center tracks of the track set forming the search data region for the normal data region. In a case of forming regions for variable-speed reproduction in a plurality of successive tracks, the same effects can be obtained by locating the normal data region at the approximate center tracks of these plurality of tracks.

EXAMPLE 12

A data recording/reproducing apparatus of Example 12 of the present invention will be described with reference to accompanying drawings. FIGS. 24A through 24D show the track pattern formed by the data recording/reproducing apparatus of Example 12 and updating of a picture. In Example 12, a case where image data is divided into M=6 horizontal strips will be described as an example.

Figure 24A:
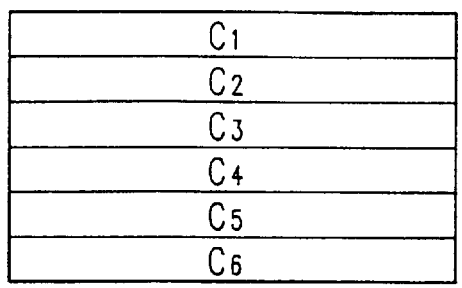
FIG. 24A is a diagram for explaining the division of a picture in Example 12.

As shown in FIG. 24A, one-frame image data is divided into six horizontal strips, which are referred to as C1, C2, C3, C4, C5 and C6 blocks in the order from the top portion to the bottom portion of the picture. The image data of each block is compressed so as to generate M=6 search data. The search data is sequentially recorded in the search data regions along the direction of tape travel from image data C1 at the top portion of the picture.

Figure 24B:
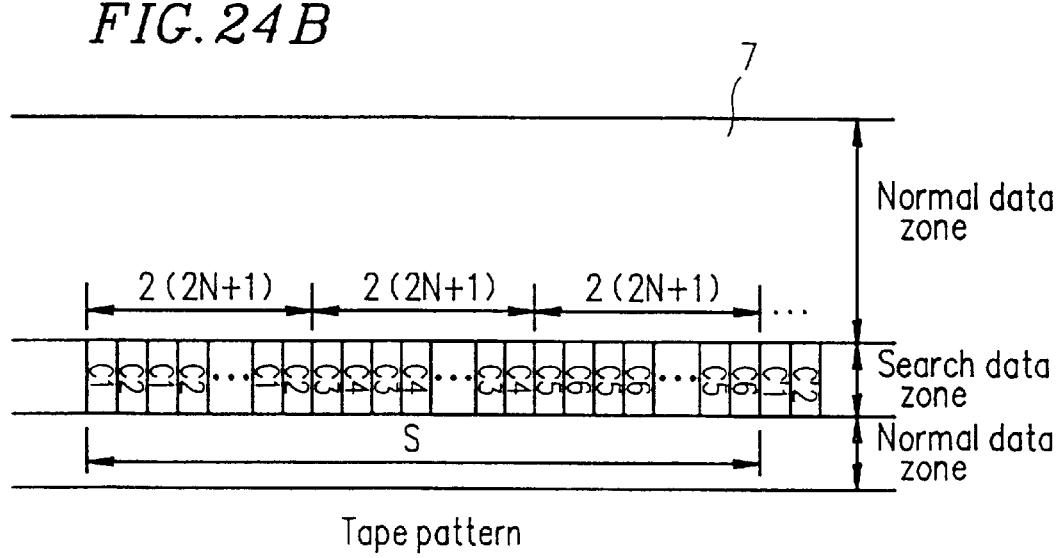
FIG. 24B is a schematic diagram showing the track pattern in Example 12 of the present invention.
Figure 24C:
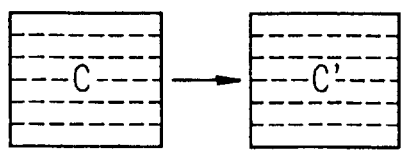
FIG. 24C is a diagram for explaining an update of a picture in high speed reproduction in Example 12.

Specifically, as shown in FIG. 24B, the data C1 is initially recorded in the search data region of one track (e.g., R-track). Next, the data C2 is recorded in the search region of its adjacent track (e.g., L-track). Each of the data C1 and C2 is recorded in the (2N+1) tracks having the same azimuth angle. Similarly, the data C3 and C4 are alternately recorded by using the next 2×(2N+1) tracks. Then, the data C5 and C6 are alternately recorded in the next 2×(2N+1) tracks. Thus, the image data of each frame is recorded one after another.

In a case where the reproduced picture is updated when all of the search data for one frame have been reproduced, for example, if reproduction is performed at the variable reproduction speed v=N+0.5=10.5 (N=10) times the normal reproduction speed, the cycle S of update of one-frame image data is equal to M×(2N+1)=126 tracks. Accordingly, in the reproduction at a speed 10.5 times the normal one, the magnetic head 6 scans S=26 tracks 12 times. If the time necessary for one scanning of the magnetic head 6 is $\frac{1}{300}$ second, the cycle of update of a reproduced picture is $\frac{12}{300}$ second. In a case where the reproduction is performed by using this search data region, e.g., at a reproduction speed 10.5 times the normal reproduction speed, the number of scannings of the magnetic head 6 within S=126 tracks is 84. In such a case, the cycle of update of a reproduced picture becomes $\frac{84}{300}$ second.

Figure 24D:
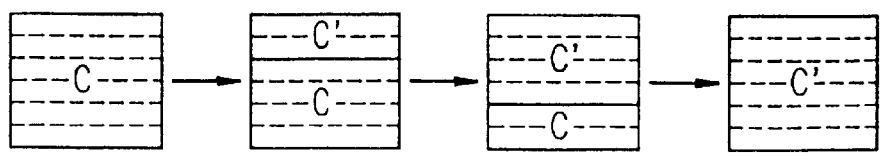
FIG. 24D is a diagram for explaining an update of a picture in low speed reproduction in Example 12.

Accordingly, in Example 12, in the search at a relatively high speed (e.g., 10.5 times the normal one), the cycle of update of a picture is set to be S=126 tracks, and the reproduced picture is updated in units of frames when all the search data for one frame have been reproduced. In the search at a relatively low speed (e.g., 1.5 times the normal one), an update cycle S' of image data is set at S'=2×(2N+1)=42 tracks. The data C1 and C2, the data C3 and C4, the data C5 and C6 and the following data can be obtained by two blocks from each of 42 tracks every $\frac{28}{30}$ second. Hence, as shown in FIG. 24D, the reproduced picture is partially updated by two blocks. For example, in the search in the normal direction, the reproduced picture is sequentially updated from each two blocks of horizontally divided blocks from the top to the bottom of the picture. Similarly, in the search in the opposite direction, the reproduced picture is updated from each two blocks of horizontally divided blocks from the bottom to the top of the picture. In this way, by shortening the cycle of update of the reproduced picture (or partially updating the reproduced picture), the reproduced picture becomes easy to see in the variable-speed reproduction. In addition, the amount of excessive search can be reduced.

As described hereinbefore, the picture to be displayed is updated per picture in the high speed reproduction, while the picture to be displayed is sequentially updated per block in the order of from the top or bottom portion of the picture in the low speed reproduction. Thus, a picture easy to see is reproduced, and the search can be performed with a reduced amount of excessive search.

EXAMPLE 13

A data recording/reproducing apparatus of Example 13 of the present invention will be described with reference to accompanying drawings. FIGS. 25A through 25D show the track pattern formed by the data recording/reproducing apparatus of Example 13 and the state of update of a picture. In Example 13, a case where image data is divided into M=6 longitudinal rectangular parts along the horizontal direction will be described as an example.

Figure 25A:
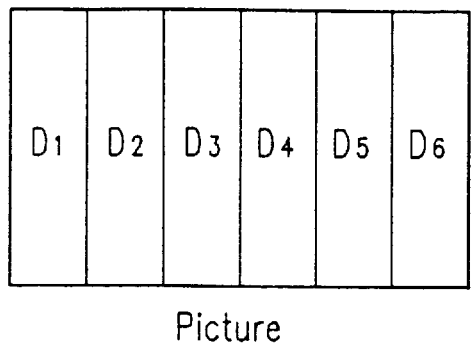
FIG. 25A is a diagram for explaining the division of a picture in Example 13.
Figure 25B:
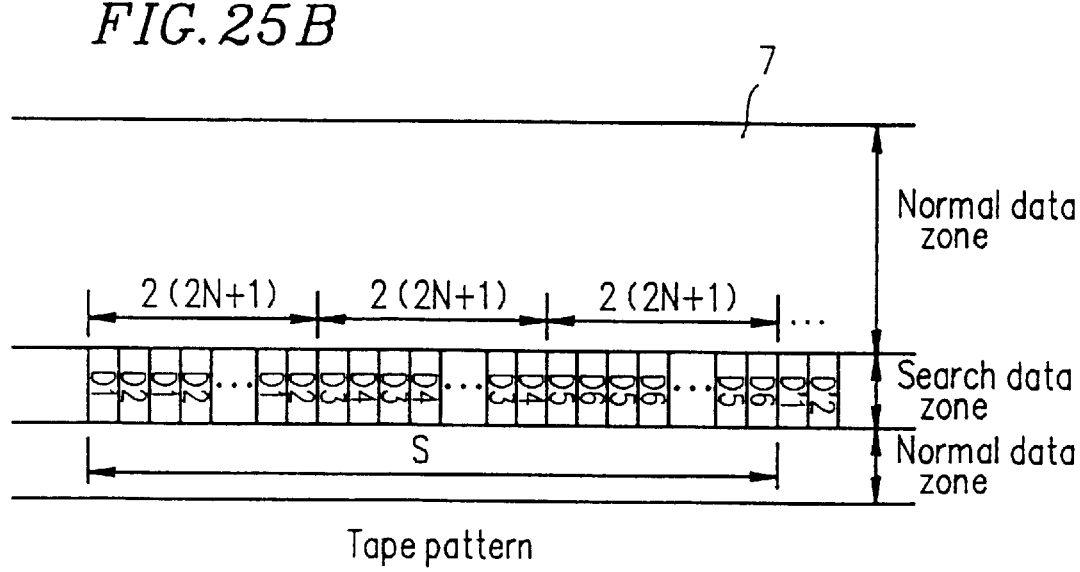
FIG. 25B is a schematic diagram showing the track pattern in Example 13 of the present invention.

As shown in FIG. 25A, one-frame image data is divided into six longitudinal strips D1, D2, D3, D4, D5 and D6 blocks from the left portion to the right portion of the picture. The image data of each block is compressed so as to generate M=6 search data. The search data are sequentially recorded in the search data regions along the direction of tape travel in the order from image data D1 at the left outermost portion of the picture.

Figure 25C:
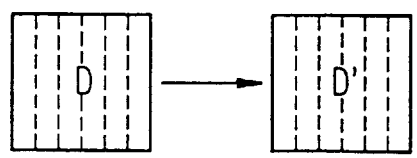
FIG. 25C is a diagram for explaining an update of a picture in high speed reproduction in Example 13.
Figure 25D:
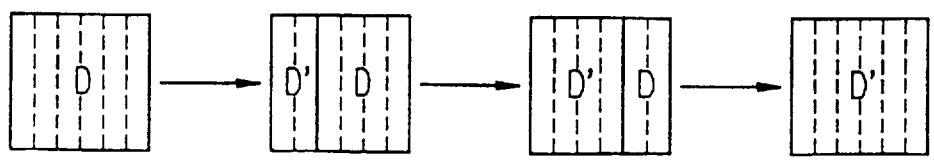
FIG. 25D is a diagram for explaining an update of a picture in low speed reproduction in Example 13.

The following process is similar to that of Example 12. In the search at a relatively high speed (e.g., 10.5 times the normal reproduction speed), as shown in FIG. 25C, the cycle S of update of one-frame image data is set at S=126 tracks. When all of the search data for one frame have been reproduced, a reproduced picture is updated per frame. In the search at a relatively low speed (e.g., 1.5 times the normal reproduction speed), the cycle S' of update of image data of one frame is set at S'=2×(2N+1)=42 tracks. Since the data D1 and D2, the data D3 and D4, the data D5 and D6 and the following data can be obtained by two blocks from each of 42 tracks every 28/300 second a reproduced picture is updated per two blocks as shown in FIG. 25D. For example, in the search in the normal direction, the reproduced picture is partially updated by each two blocks of vertically divided blocks from the left to the right of the picture. Similarly, in search in the opposite direction, the reproduced picture is partially updated from each two blocks of vertically divided blocks from the right to the left of the picture. In this way, the cycle of update of the reproduced picture is shortened, and a reproduced picture easy to see is obtained in the variable-speed reproduction. In addition, the amount of excessive search can be reduced. Also, the direction of tape travel can be easily grasped.

As described hereinbefore, the picture to be displayed is updated per picture in the high speed reproduction, while the picture to be displayed is updated per block in the order of from the left or right of the picture in the low speed reproduction. Thus, a picture easy to see is reproduced, and the search can be performed with a reduced amount of excessive search. Furthermore, the direction of the search can be easily judged.

In Examples 12 and 13, the picture is divided in the horizontal or vertical direction. However, the picture can be divided into arbitrary blocks on the picture. The reproduced image is updated per picture in the high speed reproduction, while the reproduced picture is updated per block in the low speed reproduction. In this way, the amount of excessive search can be alleviated.

In Examples 11 through 13, one search data region is provided in each track. Alternatively, a plurality of search data regions may be provided in each track.

In Examples 11 through 13, one track set is formed of (2N+1) tracks selected every other track. Needless to say, one track set can be formed of more than (2N+1) tracks selected every other track. Furthermore, the track set can be formed of an arbitrary number of plural tracks. For example, as described in Example 3, the same effects are obtainable when the standard variable reproduction speed is N' times the normal reproduction speed (N'=an even number) and the track set is formed of successive tracks more than 2N'.

Moreover, it is possible to divide one picture into a plurality of blocks in the horizontal or vertical direction and to sequentially place the data from the top or left outermost block of the picture, along the direction of tape travel, in one of the search data region, the very high speed search data region, the first intermittent search data region and the second intermittent search data region. At this time, in the variable-speed reproduction in the normal direction, the image data is updated for each of horizontally or vertically divided blocks of the reproduced picture. Accordingly, the reproduced picture gradually changes from the top to bottom portion or from the left to right portion. Thus, a reproduced picture easy to see is obtained.

Also in the variable-speed reproduction in the opposite direction, the image data is updated for each of horizontally or vertically divided blocks of the reproduced picture. Accordingly, the reproduced picture gradually changes from the bottom to top portion or from the right to left portion. Thus, a reproduced picture easy to see is obtained.

In the above-mentioned examples, the normal data and the search data are described in units of frames. However, if they are processed in units of fields, the same effects can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data recording/reproducing apparatus for recording data in a plurality of tracks located on a tape like recording medium and for reproducing recorded data from the tracks at a normal reproduction speed or a standard variable reproduction speed, wherein the recorded data is recorded in a plurality of frames, each frame having a variable number of tracks, the recorded data including image data and search data, the image data is recorded in normal data regions of the plurality of frames and the search data is recorded in search data regions of the plurality of frames, the search data is used in reproduction at the standard variable reproduction speed, the standard variable reproduction speed is (N+0.5) times (N=an integer) the normal reproduction speed, identical search data for a given frame is recorded in each of at least (2×N+1) tracks, and search data for the given frame is reproduced at the standard variable reproduction speed by combining portions of the identical search data obtained from among a plurality of the at least (2×N+1) tracks.

2. A data recording/reproducing apparatus according to claim 1, comprising:

a head means for recording data in the plurality of tracks, the head means mounted on a rotational cylinder; and a format means for providing to each of the tracks, a normal data region to be used in reproduction at the normal reproduction speed and at least one search data region to be used in reproduction at the standard variable reproduction speed; for grouping the plurality of tracks into track sets each having a predetermined number of tracks, each search data region being located in the same position on a corresponding track included in the track set, and for placing the identical search data in the search data region of each track included in the track set, wherein the tracks have at least two azimuth angles different from one another, and the tracks of the different azimuth angles are alternately located on the recording medium.

3. A data recording/reproducing apparatus according to claim 2, wherein the format means locates search data regions of the tracks included in the track set along a direction of travel of the recording medium, and thereby a search zone for the track set is formed along a direction of travel of the recording medium.

4. A data recording/reproducing apparatus according to claim 2, wherein the format means groups the plurality of tracks into track sets each having at least (2×N+1) tracks selected from every other track among the plurality of tracks.

5. A data reproducing apparatus for reproducing data from a plurality of tracks located on a tape like recording medium at a normal reproduction speed or a standard variable reproduction speed, wherein the data is recorded in a plurality of frames, each frame having a variable number of tracks, the data including image data and search data, the image data is recorded in normal data regions of the plurality of frames and the search data is recorded in search data regions of the plurality of frames, the search data is used in reproduction at the standard variable reproduction speed, the standard variable reproduction speed is (N+0.5) times (N=an integer) the normal reproduction speed, the plurality of tracks having at least two azimuth angles different from one another, the plurality of tracks being grouped into track sets according to azimuth angle, each track set is formed of more than (2×N+1) tracks, the more than (2×N+1) tracks of each track set are selected from every other track among the plurality of tracks, each track set having the search data regions located in the same position in each of the more than (2×N+1) tracks, identical search data for a given track set is recorded in each of the more than (2×N+1) tracks, and search data for the given frame is reproduced at the standard variable reproduction speed by combining portions of the identical search data obtained from among a plurality of the more than (2×N+1) tracks.

6. A data reproducing apparatus according to claim 5, wherein, in the recording medium, search data regions included in the track sets are located along a direction of travel of the recording medium and thereby a search zone is formed; and a reproduction head means of the reproducing apparatus reproduces the search data by scanning twice the search zone of each track set in the variable-speed reproduction.

7. A data reproducing apparatus according to claim 6, wherein the reproduction head means has two heads each having a different azimuth angle, the two scannings of the head means include a first scanning and a second scanning, and the reproduction head means reproduces search data from each track set by at least one of combining portions of search data read by one of the two heads from the first scanning of the head means with portions of search data read by the same one of the two heads from the second scanning of the head means, by combining portions of search data read by one of the two heads with portions of search data read by the other of the two heads, or by using data read by one of the two heads in either one of the two scannings of the head means.

8. A data recording/reproducing method for recording data in a plurality of tracks located on a tape like recording medium and for reproducing recorded data from the tracks at a normal reproduction speed or a standard variable reproduction speed, comprising the steps of recording data in a plurality of frames, each frame having a variable number of tracks, the data in the plurality of frames including identical search data in at least (2×N+1) tracks, and reproducing the recorded data at the standard variable reproduction speed of (N+0.5) times (N=an integer) the normal reproduction speed using the identical search data, wherein the recorded data includes image data and search data, the image data is recorded in a normal data region and search data is recorded in a search data region, and the identical search data recorded in the at least (2×N+1) tracks is reproduced at the standard variable reproduction speed by combining portions of the identical search data obtained from among a plurality of the at least (2×N+1) tracks.

9. A data recording/reproducing method according to claim 8, further comprising a formatting step including the steps of recording data in the plurality of the tracks by the head means mounted on a rotational cylinder, providing, to each of the tracks, a normal data region to be used in reproduction at the normal reproduction speed and at least one search data region to be used in reproduction at the standard variable reproduction speed, grouping the plurality of tracks into track sets each having a predetermined number of tracks, each search data region being located in the same position on a corresponding track included in the track set, and placing the identical search data in the search data region of each track included in the track set, wherein the tracks have at least two azimuth angles different from one another, and the tracks of the different azimuth angles are alternately located on the recording medium.

10. A data recording/reproducing method according to claim 9, wherein the formatting step includes a step of locating search data regions of the tracks included in the track set along a direction of travel of the recording medium, and thereby forming a search zone for the track set along a direction of travel of the recording medium.

11. A data recording/reproducing apparatus according to claim 9, wherein the plurality of tracks are grouped into track sets each having at least (2×N+1) tracks selected from every other track among the plurality of tracks in the grouping step.

12. A data reproducing method for reproducing recorded data from a plurality of tracks located on a tape like recording medium at a normal speed or a standard variable reproduction speed, each track having a normal data region and at least one search data region, comprising a step of reproducing the recorded data recorded in the normal data region at the standard variable reproduction speed using search data recorded in the at least one search data region, wherein the recorded data is recorded in a plurality of frames, each frame having a variable number of tracks, the standard variable reproduction speed is (N+0.5) times (N=an integer) the normal reproduction speed, the plurality of tracks having at least two azimuth angles different from one another, the plurality of tracks being grouped into track sets according to azimuth angle and selected from every other track among the plurality of tracks, each track set formed of more than (2×N+1) tracks, each search data region included in a track set being located in the same position in each track, and each track set having identical search data in each track, the identical search data of a given track set is reproduced at the standard variable reproduction speed by combining portions of the identical search data obtained from among a plurality of the tracks of the given track set.

13. A data reproducing method according to claim 12, wherein, in the recording medium, search data regions included in the track set are located along a direction of travel of the recording medium and thereby a search zone is formed; and wherein the method comprises a step of reproducing the search data by scanning twice the search zone of each track set in the variable-speed reproduction.

14. A data reproducing method according to claim 13, wherein the variable-speed reproduction is performed by using a head means having two heads each having a different azimuth angle, and wherein the reproducing step includes reproducing effective search data from each track set by combining data read by one of the two heads in two scannings of the head means, or by using data read by one of the two heads in either one of the two scannings of the head means.

* * * * *